(12) United States Patent
Flick

(10) Patent No.: US 10,956,980 B1
(45) Date of Patent: Mar. 23, 2021

(54) SYSTEMS AND METHODS FOR OPERATING DRONES IN RESPONSE TO AN INCIDENT

(71) Applicant: State Farm Mutual Automobile Insurance Company, Bloomington, IL (US)

(72) Inventor: Bryan Flick, Bloomington, IL (US)

(73) Assignee: State Farm Mutual Automobile Insurance Company, Bloomington, IL (US)

(*) Notice: Subject to any disclaimer, the term of this patent is extended or adjusted under 35 U.S.C. 154(b) by 1075 days.

(21) Appl. No.: 15/236,105

(22) Filed: Aug. 12, 2016

Related U.S. Application Data

(60) Provisional application No. 62/317,982, filed on Apr. 4, 2016, provisional application No. 62/305,293, filed on Mar. 8, 2016, provisional application No. 62/298,614, filed on Feb. 23, 2016.

(51) Int. Cl.
*G06Q 40/08* (2012.01)
*B64C 39/02* (2006.01)
*B64F 1/00* (2006.01)
*G01C 21/00* (2006.01)
*G08G 5/00* (2006.01)

(52) U.S. Cl.
CPC ........... *G06Q 40/08* (2013.01); *B64C 39/024* (2013.01); *B64F 1/00* (2013.01); *G01C 21/00* (2013.01); *G08G 5/0069* (2013.01); *B64C 2201/127* (2013.01); *B64C 2201/141* (2013.01)

(58) Field of Classification Search
CPC ..................................................... G06Q 40/08

USPC ............................................................ 705/4
See application file for complete search history.

(56) References Cited

U.S. PATENT DOCUMENTS

| 6,542,077 | B2 | 4/2003 | Joao |
| 7,397,362 | B2 | 7/2008 | Zhang |
| 7,397,363 | B2 | 7/2008 | Joao |
| 8,456,293 | B1 | 6/2013 | Trundle et al. |
| 9,013,286 | B2* | 4/2015 | Chen et al. ............... B60R 1/00 340/435 |
| 9,162,753 | B1 | 10/2015 | Panto et al. |
| 9,536,148 | B2 | 1/2017 | Gross et al. |

(Continued)

OTHER PUBLICATIONS

Auclair et al.; A Robust Approach for 3D Cars Reconstruction; SCIA'07 Proceedings of the 15th Scandinavian Conference on Image Analysis; 2007; pp. 183-192; Springer-Verlag Berlin; ISBN: 978-3-540-73039-2.*

(Continued)

*Primary Examiner* — Hani M Kazimi
(74) *Attorney, Agent, or Firm* — Armstrong Teasdale LLP

(57) ABSTRACT

A response system may be provided. The response system may include an autonomous drone. The autonomous drone may include a processor, a memory in communication with the processor, and a sensor. The processor may be programmed to build a virtual map of a coverage area, store the virtual map in the memory, receive a deployment signal, deploy the drone in response to the deployment signal, control movement of the drone within the coverage area using the virtual map, collect sensor data of the coverage area using the sensor, and/or analyze the sensor data to generate an inventory list of the coverage area, the inventory list including a personal article within the coverage area.

20 Claims, 10 Drawing Sheets

(56) References Cited

U.S. PATENT DOCUMENTS

| | | | |
|---|---|---|---|
| 9,581,999 B2* | 2/2017 | Zhou | G06K 9/00711 |
| 10,049,583 B2 | 8/2018 | Salentiny et al. | |
| 10,137,984 B1* | 11/2018 | Flick | G08G 5/006 |
| 10,173,773 B1* | 1/2019 | Flick | G08G 5/045 |
| 10,669,025 B1* | 6/2020 | Flick | G05D 1/106 |
| 10,752,355 B1* | 8/2020 | Flick | G08G 5/0086 |
| 2008/0144884 A1* | 6/2008 | Habibi | G01C 11/02 |
| | | | 382/103 |
| 2009/0265193 A1* | 10/2009 | Collins | G06Q 30/0185 |
| | | | 705/4 |
| 2011/0130636 A1 | 6/2011 | Daniel et al. | |
| 2011/0161117 A1* | 6/2011 | Busque | G06Q 40/08 |
| | | | 705/4 |
| 2012/0210853 A1 | 8/2012 | Abershitz et al. | |
| 2014/0027131 A1* | 1/2014 | Kawiecki | A62C 3/0242 |
| | | | 169/45 |
| 2014/0146173 A1* | 5/2014 | Joyce et al. | |
| 2014/0316614 A1* | 10/2014 | Newman | G06Q 30/0611 |
| | | | 701/3 |
| 2015/0363717 A1* | 12/2015 | Lim | G06Q 10/0633 |
| | | | 705/4 |
| 2016/0035224 A1* | 2/2016 | Yang et al. | |
| 2016/0063642 A1* | 3/2016 | Luciani | G06Q 40/08 |
| | | | 705/4 |
| 2016/0104098 A1 | 4/2016 | Matula et al. | |
| 2016/0107749 A1* | 4/2016 | Mucci | B64C 39/024 |
| | | | 701/3 |
| 2016/0116914 A1 | 4/2016 | Mucci | |
| 2016/0180467 A1* | 6/2016 | Griffin | G06F 16/7837 |
| | | | 705/4 |
| 2016/0180719 A1 | 6/2016 | Wouhaybi et al. | |
| 2016/0195602 A1 | 7/2016 | Meadow | |
| 2016/0214717 A1 | 7/2016 | De Silva | |
| 2016/0266577 A1* | 9/2016 | Kerzner | G05D 1/0022 |
| 2016/0328979 A1 | 11/2016 | Postrel | |
| 2016/0340006 A1 | 11/2016 | Tang | |
| 2016/0347462 A1 | 12/2016 | Clark | |
| 2017/0011465 A1 | 1/2017 | Anastassov et al. | |
| 2017/0083979 A1* | 3/2017 | Winn et al. | |
| 2017/0207926 A1 | 7/2017 | Gil et al. | |
| 2017/0253330 A1 | 9/2017 | Saigh et al. | |
| 2018/0095467 A1* | 4/2018 | Perrone | |
| 2018/0246529 A1* | 8/2018 | Hu et al. | |

OTHER PUBLICATIONS

Wefelscheid et al.; Three-Dimensional Building Reconstruction Using Images Obtained by Unmanned Aerial Vehicles; International Archives of the Photogrammetry, Remote Sensing and Spatial Information Sciences; vol. XXXVIII-1/C22; UAV-g 2011; Conference on Unmanned Aerial Vehicle in Geomatics; Zurich, Switzerland.*

"Canary", Canary Connect, Inc., retrieved from https://canary.is/, available before Aug. 12, 2016.

"Rovio" WowWee Group Limited, retrieved from http://web.archive.org/web/20091103031154/http://www.wowwee.com/en/products/tech/telepresence/rovio/rovio?, Nov. 3, 2009.

* cited by examiner

US 10,956,980 B1

SYSTEMS AND METHODS FOR OPERATING DRONES IN RESPONSE TO AN INCIDENT

RELATED APPLICATION

This application is related to co-pending U.S. Ser. No. 15/236,192, filed on Aug. 12, 2016, and U.S. Ser. No. 15/236,154, filed on Aug. 12, 2016, and claims priority to U.S. Provisional Patent Application Ser. No. 62/298,614, filed Feb. 23, 2016, U.S. Provisional Patent Application Ser. No. 62/305,293, filed Mar. 8, 2016, and U.S. Provisional Patent Application Ser. No. 62/317,982, filed Apr. 4, 2016, the contents of each are hereby incorporated by reference, in their entirety and for all purposes, herein.

FIELD OF THE INVENTION

The present disclosure relates to operating response drones for data gathering and, more particularly, to network-based systems and methods for operating response drones to gather data and respond to incidents at a specific property.

BACKGROUND

Damage and/or burglary may occur to properties (e.g., buildings and land) due to weather, people, animals, and/or internal components, such as electrical wiring. When an owner and other parties associated with the property are present, at least some of the damage or theft may be identified and/or mitigated. For example, the owner may identify a fire within his or her home, and quickly extinguish the fire resulting in less damage as compared to a situation where the owner was not present within the home at the time of the fire. In another example, the owner may detect a burglary in progress and call law enforcement to apprehend the burglar. However, if the owner and/or other parties are not present or monitoring the property at the time of the incident, damage and/or a theft may occur without a timely responsive action to mitigate the damage or theft. In some cases, such as a fire, the damage caused to the property may increase due to a delay in performing responsive actions. Insurance costs associated with the property to cover the damage and/or theft may also increase due to no one being present at the location or the time of the incident (i.e., an event resulting in damage or theft of a property). In addition, the cause or origin of the damage or theft may not be easily identified after the damage or theft has been left unmitigated.

At least some known security systems may be installed at properties to monitor for damage and/or theft, and to alert one or more parties such as the owner of the property, law enforcement, a fire service provider, and/or a medical service provider to respond to the damage or theft. These security systems may include stationary sensors (e.g., cameras) that monitor portions of the property, such as doors and windows, and may be configured to identify only one form of damage or theft, such as (but not limited to) fire damage, flooding damage, and/or theft damage. Installing these known security systems to monitor most if not all of the property for more than one type may be costly for at least some owners.

BRIEF SUMMARY

The present embodiments may relate to response systems for detecting and responding to incidents within a coverage area including one or more properties (e.g., buildings and land). The coverage area may include one or more zones. The response systems may include a drone positioned near or within the coverage area, a navigation system, a security system, a user computing device, an insurance computing device, and/or a control center. The drone may detect a triggering activity and at least one zone associated with the triggering activity. The triggering activity may include a deployment request from the security system and/or the user computing device, expiration of a predetermined period of time, and/or sensor data collected by the security system or a sensor of the drone. The drone may be configured to determine a navigation path to the zone based upon stored information (e.g., a map of the coverage area) and navigation data received from the navigation system. The drone may deploy from the control center and travel to the zone based upon the navigation path. The drone may update the navigation path to avoid obstacles blocking the navigation path. Once the drone arrives at the zone, the drone may collect sensor data using the sensor and transmit the collected sensor data to the user computing device for review. The user computing device may control the drone to provide specific sensor data or manually navigate the drone. If an incident causing potential damage and/or theft to the property is detected based upon the sensor data, the user computing device may activate a response device of the drone (e.g., a fire extinguisher or alarm) to respond to the incident. The user computing device may further notify an emergency service provider. In at least some embodiments, the drone may transmit the sensor data to an insurance computing device that determines whether or not to initiate an insurance activity, such as generating an insurance claim based upon the sensor data. The insurance computing device may automatically initiate the insurance activity based upon the determination.

In one aspect, a response system may be provided. The response system may include an autonomous drone. The autonomous drone may include a processor, a memory in communication with the processor, and a sensor. The processor may be programmed to build a virtual map of a coverage area, store the virtual map in the memory, receive a deployment signal, deploy the drone in response to the deployment signal, control movement of the drone within the coverage area using the virtual map, collect sensor data of the coverage area using the sensor, and/or analyze the sensor data to generate an inventory list of the coverage area, the inventory list including a personal article within the coverage area. The response system may include addition, fewer, or alternative components and/or functions, including those described elsewhere herein.

In another aspect, a method for generating an inventory list for a coverage area using a response system may be provided. The response system may include an autonomous drone and a processor. The method may be, at least partially, performed by the processor. The method may include building a virtual map of a coverage area, storing the virtual map in a memory associated with the drone, receiving, by the drone, a deployment signal, deploying the drone in response to the deployment signal, controlling, by the processor, movement of the drone within the coverage area using the virtual map, collecting sensor data of the coverage area using a sensor of the drone, and/or analyzing, by the processor, the sensor data to generate an inventory list of the coverage area, the inventory list including a personal article within the coverage area. The method may include additional, fewer, or alternative steps, including those described elsewhere herein, and may be implemented via one or more autonomous drones and/or local or remote processors, sensors, and/or transceivers.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
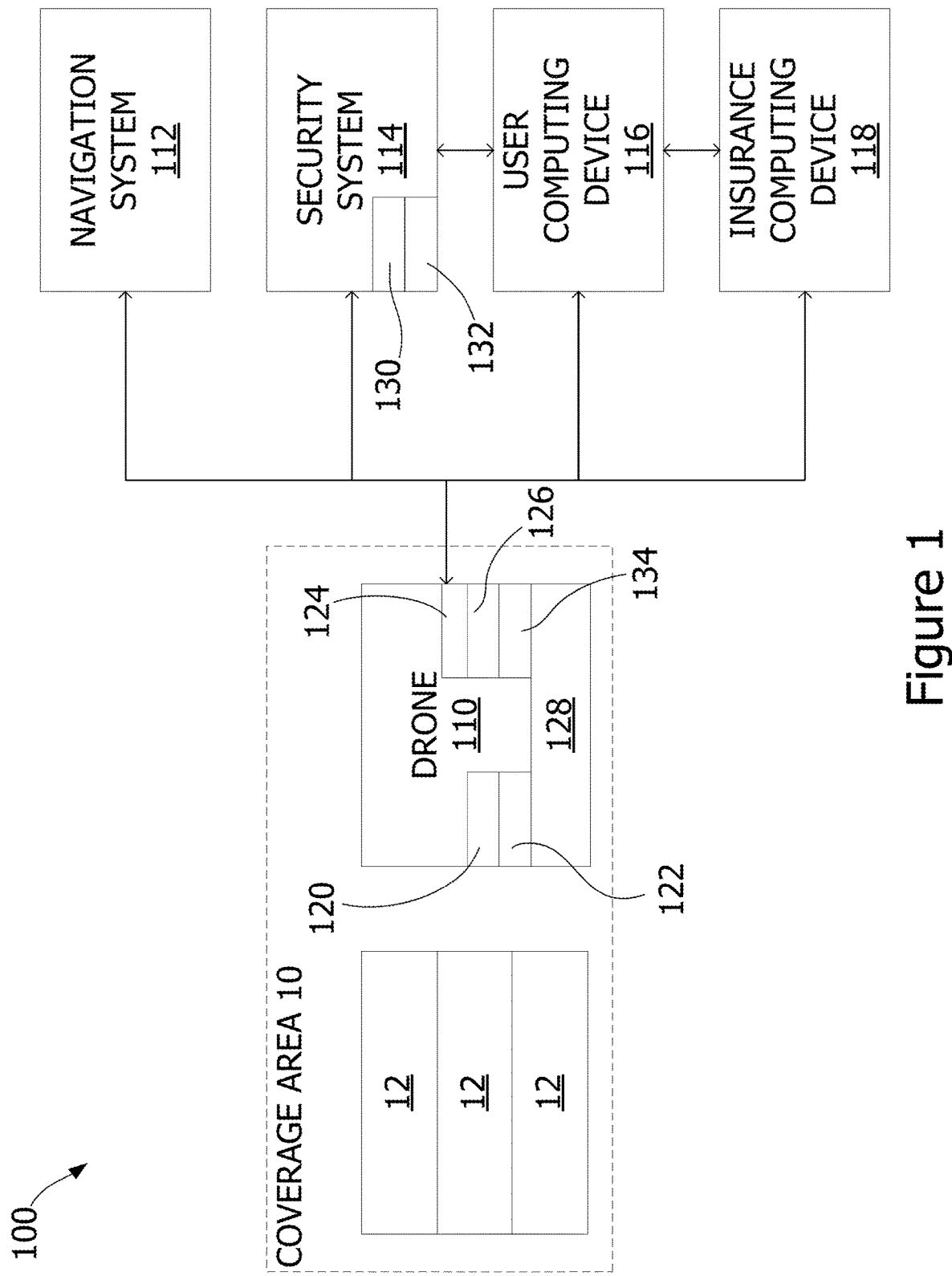
FIG. 1 illustrates a block diagram of an exemplary response system to detect and/or respond to incidents that may cause damage and/or theft to a property.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for detecting and responding to incidents within a coverage area including one or more properties using drones. As used herein, "property" may refer to a building (e.g., a home or commercial building) or piece of land, and "incident" may refer to an event occurring to the property that may lead to potential damage and/or theft (e.g., a fire or a burglary). Property may also refer to a group of properties, such as a neighborhood. The coverage area may include an interior and/or exterior of one or more properties. A drone may be configured to monitor a coverage area to detect incidents occurring within and/or approximate to the coverage area and respond to these incidents.

As used herein, a drone may be an unmanned vehicle configured to travel autonomously, semi-autonomously, and/or manually based upon data collected by the drone and/or control signals received from other computing devices. The drone may include one or more sensors (e.g., a camera, a motion detector, a thermal camera, a smoke alarm, etc.) to collect sensor data from the coverage area. The drone may be docked at a control center positioned within or near the coverage area while not in use. The control center may include a computing device in communication with the drone that is configured to perform or cause the drone to perform the functions described herein. In at least some embodiments, the control center may be configured to charge the drone.

The drone (also referred to herein as a "response drone") and/or the control center may be configured to detect a triggering activity. The triggering activity may cause the drone to deploy (such as autonomously or automatically deploy) based upon information associated with the triggering activity. The triggering activity may include, but is not limited to, a deployment request, expiration of a predetermined time period, and/or collected sensor data. The deployment request may be received from a user computing device associated with an owner or other party of the property. The deployment request may also be received from a security system associated with the coverage area if the security system detects sensor data that may indicate a potential incident within the coverage area. In the exemplary embodiment, the drone and/or the control center may be further configured to identify one or more zones of the coverage area associated with the triggering activity. As used herein, a "zone" refers to a sub-region of a coverage area. For example, a zone may be a room or floor within a house. In another example, a zone may be a house within a neighborhood. The drone may store a map of zones within the coverage area in a memory associated with the drone.

Based upon the zone associated with the triggering activity, the drone may determine a navigation path to the detected zone. In at least some embodiments, the drone may retrieve the map of zones from the memory to determine the navigation path. The map may include information such as potential obstacles, points of entry to the zone, and/or names for each zone. In some embodiments, the navigation path may be a predefined path stored in the memory with the map.

The drone may also be in communication with a navigation system that transmits navigation data to the drone. For example, the drone may by in communication with a Global Positioning System (GPS) or a Global Navigation Satellite System (GNSS). In some embodiments, the navigation system may be configured to provide navigation data for the interior of a property. For example, the navigation system may include a plurality of sensors installed within the property that are communicatively coupled to the drone to provide the navigation data, such as via wireless communication or data transmission over one or more indirect or direct radio frequency links.

Once the navigation path is determined, the response drone may be deployed from the control center and may follow the navigation path towards the zone. In the exemplary embodiment, the drone may include one or more object detectors to detect obstacles blocking the navigation path. To follow the navigation path and avoid the detected obstacles, the drone may receive the navigation data and adjust the movement of the drone based upon the detected obstacles and the navigation data. In some embodiments, the drone may update the navigation path based upon the detected obstacles and the navigation data before adjusting the movement of the drone.

Once the response drone reaches the zone associated with the triggering activity, the drone collects sensor data from the zone. In some embodiments, the drone may collect initial sensor data and analyze the initial sensor data to detect any potential points-of-interest (POIs) in the zone. More specifically, the drone may analyze the initial sensor data to detect any potential incidents, damage, and/or theft. For example, if the drone includes a thermal camera, the drone may detect a potential fire. In another example, the drone may store image data of the zone and may compare an image of the initial sensor data to the stored image to determine if any items have been potentially stolen. The drone may tag the POIs within the collected sensor to enable other computing devices such as the user computing device to detect the POIs.

The drone may transmit at least a portion of the collected sensor data to the user computing device associated with an owner or other party of a property within the coverage area. The owner may view of the sensor data, such as image data, video data, thermal data, radar data, infrared data, audio data, and the like, at the user computing device to monitor the property. The user computing device may be configured to control the drone to enable the owner to navigate the drone through the coverage area and collect the sensor data.

The user computing device may also be configured to set automated parameters for the drone. For example, the user computing device may set a predetermined period of time between automatic deployments of the drone. The user computing device may also be in communication with the security system. In one example, if the owner notices that a door is unlocked from image data received with the sensor data, the user computing device may cause the security system to lock the door. The user computing device may be in communication with other integrated computing devices within the coverage area to make changes based upon the sensor data.

If the owner determines that damage or theft has occurred within the coverage area based upon the sensor data, the user computing device may be configured to provide the owner with an option to notify an emergency service provider or another party of the damage or theft. In some embodiments, the drone, the user computing device, and/or the security system may automatically determine to notify the emergency service provider based upon the sensor data. In the exemplary embodiment, the user computing device may transmit the sensor data to the emergency service provider. In other embodiments, the drone or the security system may transmit the sensor data to the emergency service provider. The drone may store the sensor data for further analysis.

The owner and/or the emergency service provider may respond appropriately to the incident. For example, the emergency service provider may send first responders to the property if a fire is detected. In at least some embodiments, the response drone may include one or more response devices to prevent, mitigate, or otherwise reduce damage or theft. The response device may include, but is not limited, a flashlight, a speaker, a fire extinguisher, a water hose, and/or an alarm. In one example, if a fire is detected, the response drone may activate an integrated fire extinguisher to put out the fire. In another example, if a potential burglary is detected, an integrated alarm of the response drone is activated to drive away the potential thief. The user computing device may be configured to control the response drone to activate the response device. In some embodiments, the response drone may automatically activate the response device.

In the exemplary embodiment, the drone and/or the user computing device may be in communication with one or more insurance computing devices, such as via wireless communication or data transmission over one or more radio frequency links. Each insurance computing device may be associated with an insurance provider. At least one insurance provider is associated with an insurance policy for a property within the coverage area. The drone and/or the user computing device may transmit the collected sensor data the insurance computing device. The insurance computing device may be configured to analyze the sensor data to determine whether or not to initiate an insurance activity. The insurance activity may include, but is not limited to, generating an insurance claim, adjusting an insurance policy, providing a discount, generating an insurance quote, generating an insurance-related recommendation, and/or providing an insurance-related reward.

At least one of the technical problems addressed by this system may include: (i) long response times to damage and/or theft occurring at a property; (ii) limited coverage of the property to identify damage or theft using stationary or fixed sensors; (iii) limited control for an owner of the property to automate and customize at least some known security systems; (iv) limited information collected by at least some known security systems may be sent to the owner; and (v) increased insurance costs associated with damage and/or theft that may be mitigated with a timely responsive action.

A technical effect of the systems and processes described herein may be achieved by performing at least one of the following steps: (i) detecting, by a response drone, a triggering activity associated with a first zone of a plurality of zones within a coverage area; (ii) determining a navigation path to the first zone; (iii) traveling, by the drone, to the first zone based upon the determined navigation path; (iv) collecting, by the drone, sensor data using a sensor at the first zone; and (v) transmitting the collected sensor data to a user computing device associated with the coverage area for review.

The technical effect achieved by this system may be at least one of: (i) reduced response times to damage and/or theft occurring at a property; (ii) increased coverage of the property to identify damage or theft using mobile drones; (iii) increased control for an owner of the property to automate and customize at least some known security systems; (iv) increased information collected by the drone may be sent to the owner for review; and (v) reduced insurance costs associated with damage and/or theft that may be mitigated with a timely responsive action.

Exemplary Response System

FIG. 1 depicts an exemplary response system 100 for detecting and responding to incidents within a coverage area. In the exemplary embodiment, system 100 may include a response drone 110, a navigation system 112, a security system 114, a user computing device 116, and/or an insurance computing device 118. In other embodiments, system 100 may include additional, fewer, or alternative components, including those described elsewhere herein.

In the exemplary embodiment, response drone 110 may be positioned near or within coverage area 10. Coverage area 10 may be an area including one or more properties. The properties may include, but are not limited to, buildings, land, and/or objects located within the buildings or on the land. In the exemplary embodiment, each property may be associated with an owner or an owning party and an insurance policy. Coverage area 10 may be, for example, a building, a neighborhood, a city block, and/or a plot of land (e.g., owned land including any building on the owned land). Coverage area 10 may be divided into a plurality of zones 12 for collecting data and responding to incidents as described herein. In one example, if coverage area 10 is a residential house, zones 12 may be separate rooms and hallways of the building. In another example, if coverage area 10 is a neighborhood, each zone 12 may be a plot of land associated with each building in the neighborhood.

In the exemplary embodiment, response drone 110 may include a processor 120, a memory device 122 in communication with processor 120, and/or one or more sensors 124. Drone 110 may be configured to move autonomously, semi-autonomously, and/or manually. Drone 110 may be any kind of land, nautical, or aeronautical drone (or smart robot). For exemplary purposes only and without limitation, drone 110 is referred to herein as an aeronautical drone. That is, drone 110 may be configured to travel by flying.

Sensors 124 may be configured to collect sensor data of coverage area 10. Sensors 124 may include any type of sensor such as a camera, a video recorder, a thermal camera, a range sensor, temperature sensor, moisture sensor, smoke detector, luminosity sensor, radiation detector, motion detector, pressure sensor, an audio recorder, radar unit, infrared sensor, and/or other types of sensors. Sensors 124 and/or processor 120 may be configured to collect, without limitation, image data, video data, thermal image data, positioning data, temperature data, time data, moisture data, smoke data, luminosity data, radiation data, motion data, pressure data, and/or audio data. In the exemplary embodiment, processor 120 may control the operation of sensors 124. In other embodiments, sensors 124 may include a processor and/or memory device (not shown) to capture and process sensor data autonomous of processor 102.

Each sensor 124 may be operated independently or dependently of other sensors 124. For example, in some embodiments in which sensors 124 may include a camera and another sensor, the camera may be configured to capture image data concurrently with the other sensor. Sensors 124 may include user-defined settings to control the operation of sensors 124 (e.g., a camera sensor may have image resolution and image acquisition rate settings). Sensors 124 may be the same type of sensor (e.g., two camera sensors) or different types of sensors. In some embodiments, sensors 124 may send the captured data to processor 120 for data processing (e.g., processing image data).

In the exemplary system, response drone 110 may also include an object detector 126. Object detector 126 is configured to identify objects near drone 110. In some embodiments, object detector 126 may include a sonar detector, a radar detector, an ultrasonic detector, and/or another waveform detector. As described herein, drone 110 may be configured to detect objects, and alter or update a travel path of drone 110 to avoid the detected objects.

In the exemplary embodiment, response drone 110 may be deployable from a control center 128. Control center 128 may be positioned near or within coverage area 10 to facilitate deployment of drone 110 at coverage area 10. Control center 128 may be configured to support, charge, and/or communicate with drone 110. In at least some embodiments, control center 128 is a separate computing device from drone 110 that includes a processor and a memory device (both not shown). Control center 128 may be configured to generate control signals to operate drone 110. Control center 128 may be configured to perform and/or cause drone 110 to perform at least some of the functions described herein. For example, control center 128 may be in communication with one or more computing devices of system 100 (e.g., navigation system 112) and provide drone 110 with control signals or data received from the computing devices.

In the exemplary embodiment, navigation system 112 may be in communication with response drone 110. Navigation system 112 may be one or more computing devices configured to scan a geographical region including coverage area 10, generate navigational data, and/or provide the navigational data to drone 110. In certain embodiments, navigation system 112 may be configured to scan one or more specific zones 12 within coverage area 10. The navigation data may include, for example, a map of the geographical region, obstacles within the region, and/or location data. In the exemplary embodiment, drone 110 may be identifiable by navigation system 112 during scanning and navigation system 112 may transmit navigation data include the location of drone 110 relative to the geographic region and/or coverage area 10. Navigation system 112 may be, but is not limited to, a Global Positioning System (GPS), a Global Navigation Satellite System (GNSS), and/or another position or navigation system.

In another example, if coverage area 10 is a building, navigation system 112 may include two or more position sensors (not shown in FIG. 1) in communication with drone 110. Each position sensor may determine a position of drone 110 relative to the respective position sensor and transmits the determined position to drone 110. Drone 110 may be configured to determine where drone 110 is located within coverage area 10 based upon each determined position from the position sensors, such as by using triangulation techniques along with known GPS coordinate information received from home-mounted sensors, and/or other ranging and bearing determination techniques. In one embodiment, the drone 100 may be able to build a navigation map of the interior of a home or other property from sensor data generated from one or more drone-mounted sensors or devices, and/or from one or more home-mounted sensors or devices.

Security system 114 may be installed at one or more properties within coverage area 10. In certain embodiments, security 114 may not be installed in coverage area 10. Security system 114 may be configured to identify, prevent, and/or otherwise mitigate damage and/or theft to the properties. In the exemplary embodiment, security system 114 may include a controller 130 in communication with drone 110 and/or user computing device 116.

Security system 114 may further include one or more security sensors 132 positioned within coverage area 10. Security sensors 132 may be positioned in fixed locations within coverage area 10. For example, security sensor 132 may be a fire alarm, smoke alarm, burglary alarm, or camera at a fixed location monitoring a portion of coverage area 10. Similar to sensors 124 of drone 110, security sensors 132 may be configured to collect sensor data. Based upon the sensor data, controller 130 may determine theft and/or damage may have potentially occurred and notify user computing device 116 and/or emergency responders (e.g., law enforcement, fire service providers, and/or medical service providers). In the exemplary embodiment, controller 130 may cause drone 110 to deploy in response to the sensor data as described herein.

In addition to monitoring one or more properties, security system 114 may be configured to operate one or more systems of the properties based upon sensor data collected by security sensors 132 and/or control signals sent by user computing device 116. For example, controller 130 may be configured to lock and unlock doors and/or windows of a building. Controller 130 may further be configured to operate systems within a property such as a sprinkler system, heating, ventilating, and air conditioning (HVAC) systems, and the like to remotely manage the property.

In the exemplary embodiment, response drone 110 may be in communication with user computing device 116. User computing device 116 may be associated with an owner or other party related to one or more properties within coverage area 10. In some embodiments, user computing device 116 may be associated with an insurance policy holder of a property within coverage area 10. User computing device 116 may include, for example, a computer, a laptop, a tablet, a smartphone, and/or a kiosk terminal. User computing device 116 may include a mobile device (such as a smartphone, laptop, tablet, phablet, wearable electronics, smart glasses, smart watch or bracelet, personal digital assistant, pager, or other mobile computing device or mobile device configured for wireless communication and/or data transmission). User computing device 116 may be configured to receive the sensor data from drone 110 and/or security system 114 to enable the user to review the sensor data and monitor the one or more properties remotely. User computing device 116 may be further configured to transmit control input to drone 110 and/or security system 114 to adjust how drone 110 and security system 114 operate.

Insurance computing device 118 may be in communication with response drone 110 and/or user computing device 116 to receive sensor data. In some embodiments, system 100 may include a plurality of insurance computing devices 118. At least one insurance computing device 118 is associated with an insurance provider that may be providing an insurance policy for one or more properties within coverage area 10. Based upon the sensor data, insurance computing device 118 may determine whether or not an insurance policy holder is eligible for one or more insurance activities (e.g., generating an insurance claim, adjusting an insurance policy, providing a discount, and/or providing an insurance-related reward). If the insurance policy holder is eligible, insurance computing device 118 may be configured to automatically initiate the insurance activity. For example, insurance computing device 118 may automatically populate an insurance claim for using information from the sensor data and information stored by insurance computing device 118.

In the exemplary embodiment, system 100 may be configured to collect data associated with coverage area 10 to facilitate detecting, preventing, and otherwise mitigating property damage and/or theft even if the owner or another party associated with the property is not present. In particular, drone 110 may be configured to deploy in response to a triggering activity. The triggering activity may include a deployment request, expiration of a predetermined time period, and/or collected sensor data. The deployment request may be received from security system 114 and/or user computing device 116.

The predetermined time period may be an automated schedule to facilitate automatically collect the sensor data from coverage area 10 at recurring intervals. In at least some embodiments, user computing device 116 may be configured to set and/or adjust the automated schedule of drone 110. The sensor data may be collected by drone 110 and/or security system 114 and may indicate that an incident causing potential damage and/or theft may have occurred within coverage area 10.

In the exemplary embodiment, the triggering activity may also be associated with one or more zones 12. For example, the triggering activity may be associated with an alarm of security system 114 activating in a zone 12. In another example, user computing device 116 may be configured to build and/or display a map of coverage area 10 that enables the owner to select specific zones 12 to direct drone 110 to collect sensor data at the selected zones 12. If the triggering activity is associated with a zone 12, drone 110 may be configured to deploy and travel to associated zone 12. If no zone 12 is associated with the triggering activity, drone 110 may be configured to deploy and travel around at least a portion of coverage area 10.

In the exemplary embodiment, drone 110 may be configured to determine a navigation path to zone 12 associated with the triggering activity. In at least some embodiments, drone 110 may build and/or store a map of coverage area 10 within memory device 124 and/or another memory associated with drone 110 that may include information such as potential obstacles, points of entry to the zone, and names for each zone. Drone 110 may also receive the navigation data from navigation system 112 to determine the navigation path, and/or build a navigation map of the coverage area.

Drone 110 may deploy from control center 128 and automatically travel along the determined navigation path through coverage area 10. As drone 110 travels, drone 110 may be configured to receive additional navigation data from navigation system 112 to automatically adjust its movement and/or the navigation path. In certain embodiments, object detectors 126 may be configured to identify nearby objects and drone 110 may update the navigation path to avoid objects that may potentially block the navigation path. For example, if a door is closed that blocks the navigation path, drone 110 may update the navigation path to circumvent the closed door.

In at least some embodiments, user computing device 116 may be configured to transmit control inputs to drone 110 to navigate drone 110 through coverage area 10 manually. In some embodiments, drone 110 may be configured to switch between automated and manual control of navigation. For example, drone 110 may automatically travel along the navigation path until an obstacle is reached and user computing device 116 may transmit control inputs to drone 110 to navigate around the obstacle.

Once drone 110 reaches zone 12 associated with the triggering activity, drone 110 may be configure to collect sensor data from zone 12 using sensors 124. In some embodiments, drone 110 may collect initial sensor data and analyze the initial sensor data to detect any potential pointsof-interest (POIs) in zone 12. More specifically, drone 110 may be configured to analyze the initial sensor data to detect any potential incidents, damage, and/or theft. For example, if drone 110 includes a thermal camera, drone 110 may detect a potential fire based upon collected thermal data. In another example, drone 110 may store previous image data of zone 12 and may compare an image of the initial sensor data to the stored image to determine if any items have been potentially stolen. Drone 110 may be configured to tag the POIs within the collected sensor to enable other computing devices such as user computing device 116 to identify the POIs. In some embodiments, user computing device 116 may be configured to transmit control inputs to drone 110 to operate sensors 124.

The collected sensor data may be transmitted to user computing device 116 for review. User computing device 116 and/or the user associated with user computing device 116 may determine whether or not any damage and/or theft has occurred from the sensor data. In the exemplary embodiment, user computing device 116 may be configured to provide the user an option to contact an emergency service provider or other third party.

In at least some embodiments, drone 110 and/or user computing device 116 may automatically transmit at least a portion of the collected sensor data to the emergency service provider to enable the emergency service provider to provide an appropriate response. For example, the emergency service provider may send first responders equipped with fire equipment if the sensor data indicates that a fire has occurred. In another example, if a theft occurred, the sensor data may be used by law enforcement to generate a record of the theft.

In the exemplary embodiment, drone 110 and/or user computing device 116 may be configured to transmit the sensor data to insurance computing device 118 to initiate one or more insurance activities. The sensor data may also be used by the insurance provider associated with insurance computing device 118 to determine information such as an origin of the damage and/or theft. For example, the insurance provider may determine a thief entered a property through an unlocked window based upon image data. In another example, the insurance provider may determine a fire originated from an electrical wall socket based upon thermal data and image data.

In at least some embodiments, drone 110 may further include one or more response devices 134 configured to prevent, mitigate, and/or other respond to incidents that may cause potential damage and/or theft. For example, and without limitation, response devices 134 may include a flashlight, a speaker, a fire extinguisher, a water hose, an alarm, a chemical device, and/or a tagging device (e.g., paint sprayer). The chemical device may be configured to dispense chemicals that may reduce damage to the property. For example, the chemical device may be configured to extinguish flames. In another example, the chemical device may be configured to seal openings or to absorb moisture. The tagging device may be used, for example, to mark a POI within zone 12 or to mark a potential thief. In at least some embodiments, user computing device 116 may be configured to operate response devices 134.

Once drone 110 has finished collecting sensor data and/or responding to an incident, drone 110 may be configured to navigate to another zone 12 to collect more sensor data or back to control center 128. In some embodiments, when a power supply (not shown) of drone 110 is reduced below a threshold capacity, drone 110 may automatically return to control center 218. Drone 110 may determine the navigation path to the next zone 12 or control center 128 by analyzing the stored map of coverage area 10, the navigation data from navigation system 112, and/or information received from object detector 126. In some embodiments, control center 128 may be configured to guide drone 110 back to control center 128. Once drone 110 reaches control center 128, drone 110 may dock and await another triggering activity.

Exemplary Response System for a Neighborhood

Figure 2:
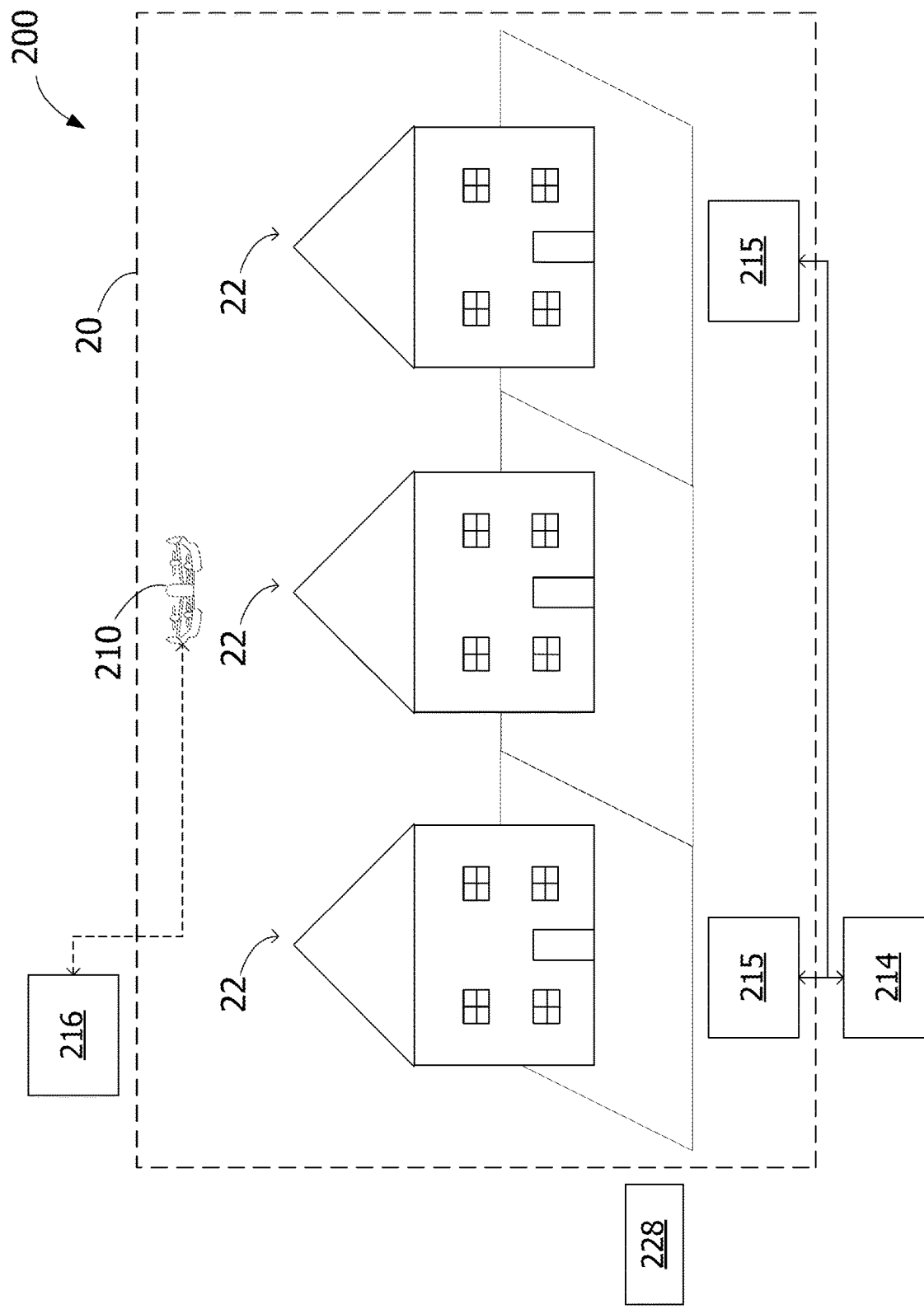
FIG. 2 illustrates a side view of an exemplary neighborhood that may be monitored by the system shown in FIG. 1 to detect and respond to incidents in the neighborhood.

FIG. 2 depicts a side view of a portion of an exemplary response system 200 for collecting sensor data from a neighborhood 20 (i.e., a coverage area) and responding to incidents. Neighborhood 20 may be divided into a plurality of zones 22. Each zone 22 may be a separate property. System 200 may be substantially similar to system 100 (shown in FIG. 1) and, in the absence of contrary representation, includes similar components and functions. In the exemplary embodiment, system 200 may include a response drone 210, a security system 214, a user computing device 216, and/or a control center 228. In other embodiments, system 200 may include additional, fewer, or alternate components, including those described elsewhere herein.

In the exemplary embodiment, drone 210 may be an aerial drone deployable from control center 228. Control center 228 may be positioned within or near neighborhood 20. Drone 210 may be configured to travel around neighborhood 20 and collect sensor data. In the exemplary embodiment, drone 210 may be configured to travel to each zone 22 at a predetermined interval or time period to collect sensor data. In at least some embodiments, drone 210 may be configured to respond to incidents occurring within neighborhood 20. Security system 214 may include security systems 215 for at least some zones 22. In the exemplary embodiment, one zone 22 may not include a security system 215. Security system 214 may be configured to monitor zones 22 and transmit a deployment request in response to potential damage and/or theft.

User computing device 216 may be operated by a user associated with neighborhood 20. For example, user computing device 216 may be operated by an owner from one or more zones 22, a party maintaining system 200, a party managing neighborhood 20 (i.e., a local government), and/or another party. In some embodiments, system 200 may include a plurality of user computing devices 216 associated with owners of each zone 22. In such embodiments, at least some user computing device 216 may be provided limited control of or access to drone 210 based upon the respective zone 22.

Exemplary Response System for a Building

Figure 3:
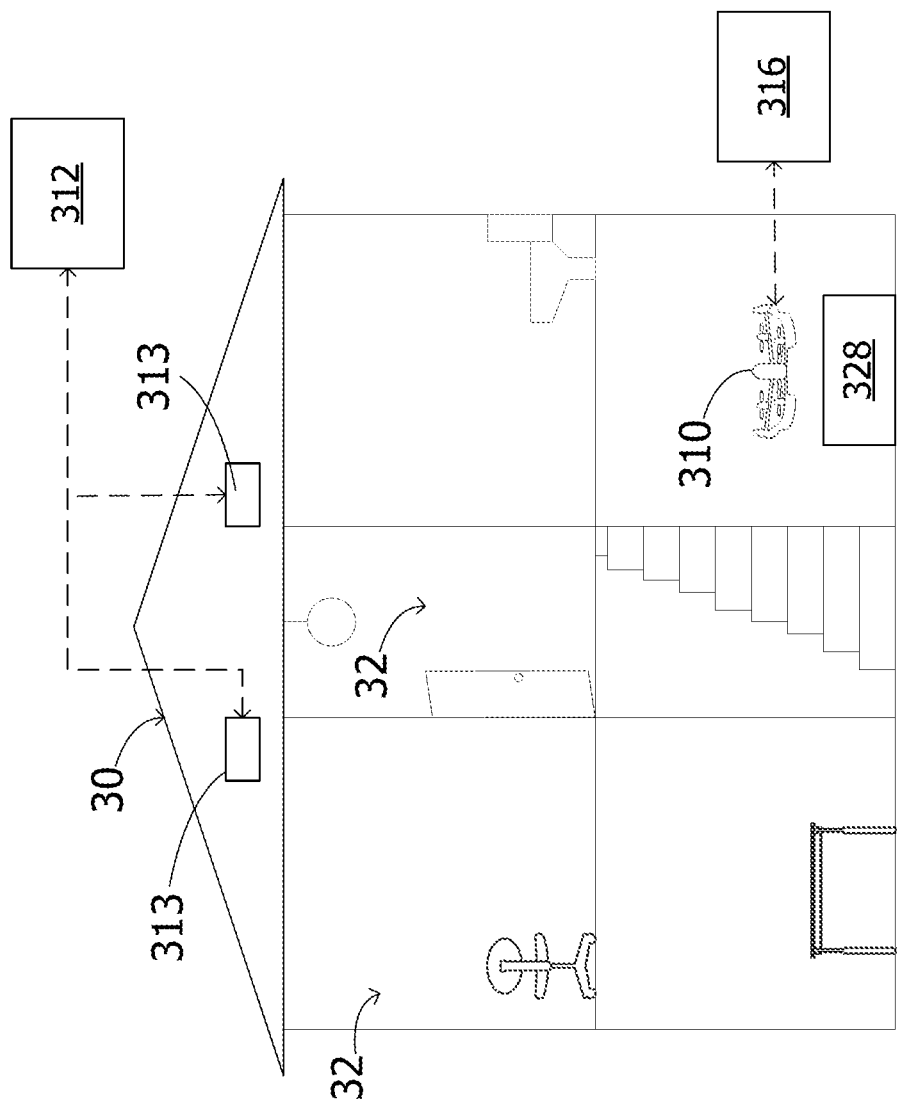
FIG. 3 illustrates a cross section side view of an exemplary building that may be monitored by the system shown in FIG. 1 to detect and respond to incidents in the building.

FIG. 3 depicts a cross sectional side view of a partial exemplary response system 300 for collecting sensor data from a building 30 and responding to incidents. Building 30 may be divided into a plurality of zones 32. Each zone 32 may be a separate room or hallway within building 30. System 300 may be substantially similar to systems 100, 200 (shown in FIGS. 1 and 2) and, in the absence of contrary representation, includes similar components and functions. In the exemplary embodiment, system 300 may include a response drone 310, a navigation system 312, a user computing device 316, and/or a control center 328. In other embodiments, system 300 may include additional, fewer, or alternate components, including those described elsewhere herein.

Drone 310 may be deployable from control center 328. In the exemplary embodiment, control center 328 may be positioned within building 30. Navigation system 312 may include two or more navigation beacons 313. In the exemplary embodiment, navigation beacons 313 may be positioned within building 30. In other embodiments, navigation beacons 313 may be positioned at different locations.

Navigation beacons 313 may be communicatively coupled to drone 310. Navigation beacons 313 may be configured to broadcast position data relative to a position of drone 310. Drone 310 may be configured to receive the position data from each navigation beacon 313 to determine its position within building 30.

For instance, data from each navigation beacon 313 may include GPS information and/or time of data transmission. Using triangulation, ranging, and/or bearing related techniques and comparison, drone 310 may determine its location within a building 30. If GPS data is determined unreliable due to the drone 310 being unable to cleanly receive satellite signals, dead reckoning (DR) or other non-GPS signal-based techniques may be used to determine the drone 310 location within the building, as well as to update its position/location within the building as it moves about the interior of the building.

User computing device 316 may be associated with an owner of building 30. In other embodiments, user computing device 316 may be associated with a different party. The owner may use response system 300 to remotely monitor building 30. For example, user computing device 316 may provide the owner with a map of building 30 with selectable zones 32. When one or more zones 32 are selected, drone 310 may be deployed to the selected zones 32 to collect sensor data and respond to any detected incidents.

Exemplary Computing Device

Figure 4:
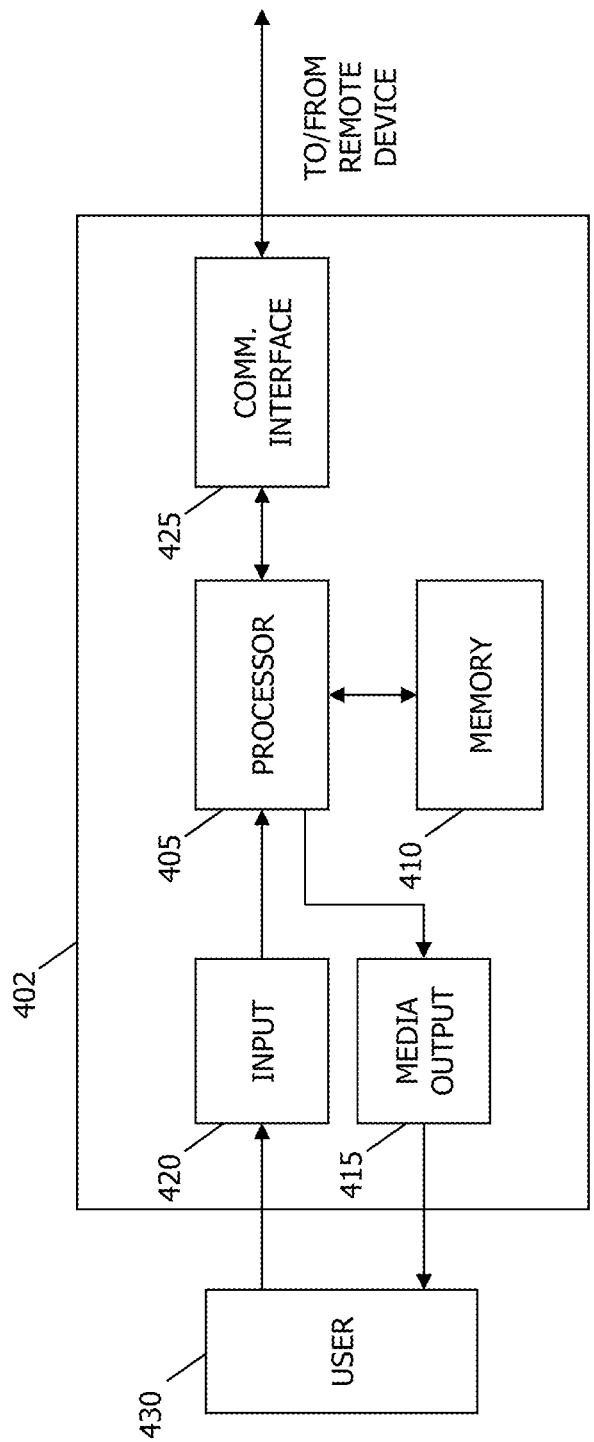
FIG. 4 illustrates a block diagram of an exemplary computing device that may be used in the system shown in FIG. 1.

FIG. 4 depicts an exemplary configuration of a computing device 402. Computing device 402 may include, but is not limited to, response drone 110, user computing device 116, insurance computing device 118, control center 128, and/or controller 130 shown in FIG. 1. Computing device 402 may also include drone 210, control center 228, and/or user computing device 216 shown in FIG. 2 and/or drone 310, control center 328, and/or user computing device 316 shown in FIG. 3.

Computing device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or other data to be stored and retrieved. Memory area 410 may include one or more computer-readable media.

Computing device 402 may also include at least one media output component 415 for presenting information to a user 430. Media output component 415 may be any component capable of conveying information to user 430. In some embodiments, media output component 415 may include an output adapter, such as a video adapter and/or an audio adapter. An output adapter may be operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 may be configured to present an interactive user interface (e.g., a web browser or client application) to user 430. The interactive user interface may include, for example, a reality augmentation interface for requesting and viewing Enhanced Situation Visualization.

In some embodiments, computing device 402 may include an input device 420 for receiving input from user 430. Input device 420 may include, for example, a keyboard, a pointing device, a mouse, a stylus, a touch sensitive panel (e.g., a touch pad or a touch screen), a camera, a gyroscope, an accelerometer, a position detector, a thermometer, a thermocouple, and/or an audio input device. A single component such as a touch screen may function as both an output device of media output component 415 and input device 420.

Computing device 402 may also include a communication interface 425, which may be communicatively coupleable to a remote device such as insurance computing device 118. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and client application. Web browsers enable users 430 to display and interact with media and other information typically embedded on a web page or a website from a web server associated with a merchant. A client application allows users 430 to interact with a server application associated with, for example, a vendor or business.

Exemplary Host Computing Device

Figure 5:
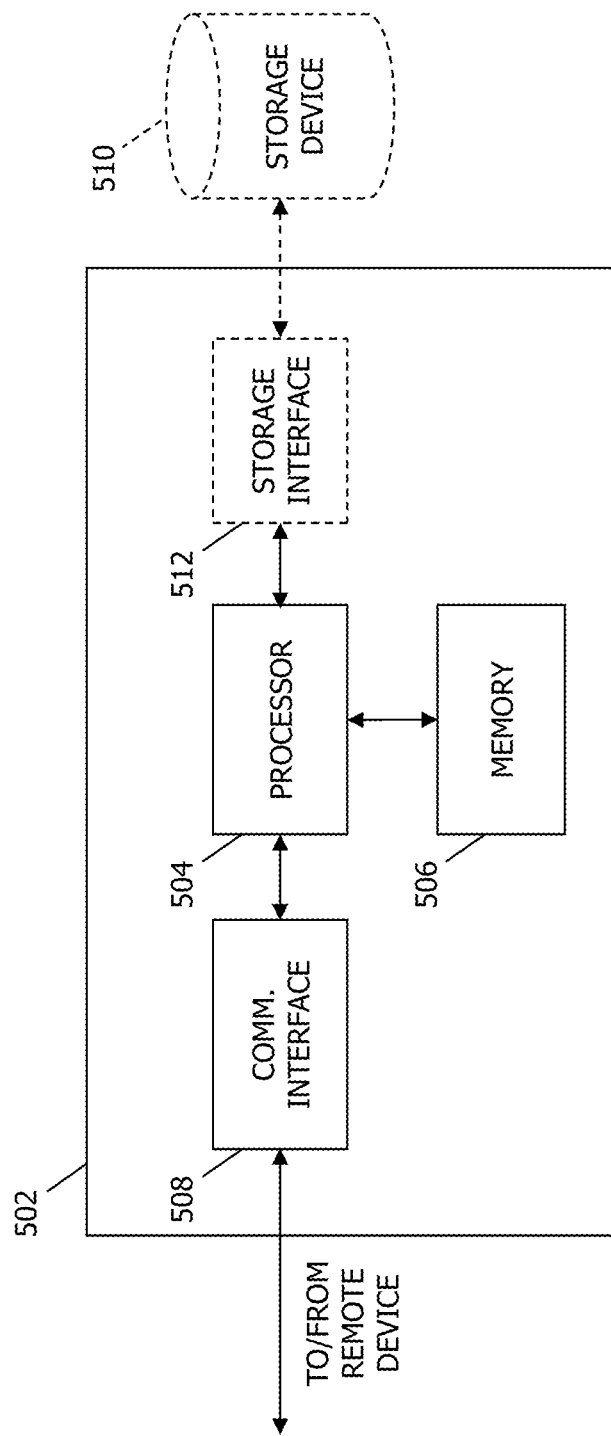
FIG. 5 illustrates a block diagram of an exemplary host computing device that may be used in the system shown in FIG. 1.

FIG. 5 depicts an exemplary configuration of a host computing device 502. Host computing device 502 may be representative of user computing device 116, insurance computing device 118, control center 128, and/or controller 130 (all shown in FIG. 1). Host computing device 502 may further be representative of user computing device 216 and/or control center 228 shown in FIG. 2 and/or user computing device 316 and/or control center 328 shown in FIG. 3. Host computing device 502 may include a processor 504 for executing instructions. Instructions may be stored in a memory area 506, for example. Processor 504 may include one or more processing units (e.g., in a multi-core configuration).

Processor 504 may be operatively coupled to a communication interface 508 such that server computing device 502 may be capable of communicating with a remote device such as computing device 402 shown in FIG. 4 or another server computing device 502. For example, communication interface 508 may receive requests from user computing device 402 via the Internet.

Processor 504 may also be operatively coupled to a storage device 510. Storage device 510 may be any computer-operated hardware suitable for storing and/or retrieving data. In some embodiments, storage device 510 may be integrated in server computing device 502. For example, server computing device 502 may include one or more hard disk drives as storage device 510. In other embodiments, storage device 510 may be external to server computing device 502 and may be accessed by a plurality of server computing devices 502. For example, storage device 510 may include multiple storage units such as hard disks or solid state disks in a Redundant Array of Inexpensive Disks (RAID) configuration. Storage device 510 may include a Storage Area Network (SAN) and/or a network attached storage (NAS) system.

In some embodiments, processor 504 may be operatively coupled to storage device 510 via a storage interface 512. Storage interface 512 may be any component capable of providing processor 904 with access to storage device 510.

Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 904 with access to storage device 910.

Memory areas 410 (shown in FIG. 4) and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
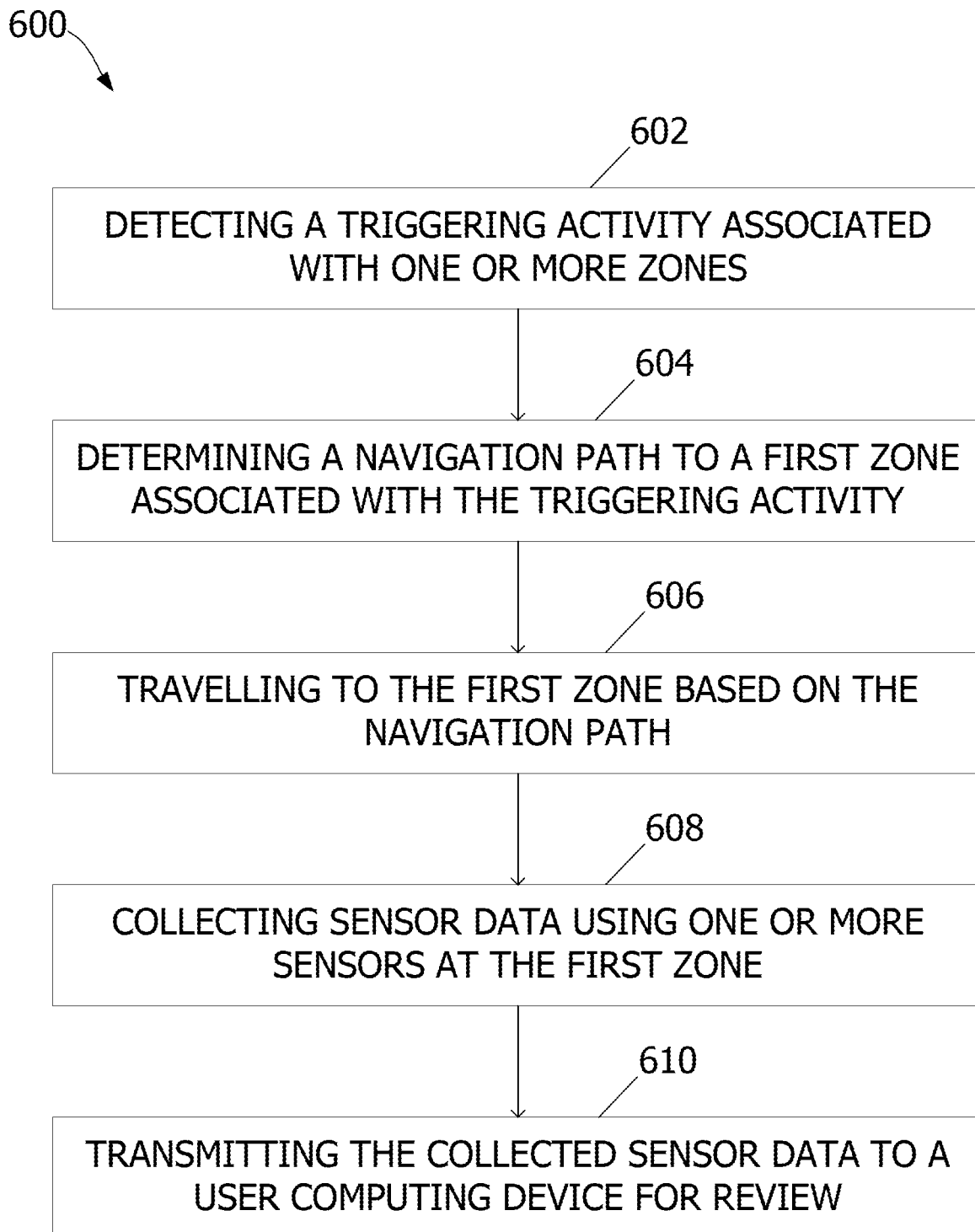
FIG. 6 is a flow diagram of an exemplary computer-implemented method for detecting and responding to incidents in a coverage area including one or more properties that may be used by the system shown in FIG. 1.

Exemplary Computer-Implemented Method for Detecting Incidents in a Coverage Area FIG. 6 depicts a flow diagram of an exemplary method 600 for detecting and responding to incidents associated with properties in a coverage area using a response system, such as systems 100, 200, 300 (shown in FIGS. 1-3). In the exemplary embodiment, method 600 may be at least partially performed by a response drone of the response system. In certain embodiments, other computing devices such as a control center communicatively coupled to the drone may perform at least some steps of method 600. In other embodiments, method 600 may include additional, fewer, or alternative steps, including those described elsewhere herein.

Method 600 may begin with the drone detecting 602 a triggering activity associated with one or more zones of the coverage area. The triggering activity may include a deployment request, an expiration of a predetermined period of time, and/or sensor data collected by a security system and/or the drone. The drone may determine 604 a navigation path to a first zone associated with triggering activity. The navigation path may be based upon stored information, such as a map of the coverage area and navigation data received from a navigation system. In other embodiments, the drone may build a map of the coverage area using the navigation data received, and/or other data generated or collected by one or more drone-mounted sensors in real time. The drone may travel 606 to the first zone based upon the determined navigation path. In at least some embodiments, the drone may adjust the navigation path to avoid obstacles or to otherwise navigate to the first zone.

Once the drone reaches the first zone, the drone may collect 608 sensor data using one or more sensors at the first zone. In certain embodiments, the drone may detect one or more POIs from the collected sensor data and tag the POIs to facilitate identification of the POIs by other computing devices. The drone may activate a response device if potential damage or theft is detected. The drone may transmit 610 the collected sensor data to a user computing device associated with the coverage area for review. In some embodiments, the drone may transmit the collected sensor data to an insurance computing device to determine if an insurance activity should be initiated in response to the collected sensor data.

In some embodiments, the user computing device may be configured to transmit control inputs or signals to the drone to manually or semi-autonomously control the operation of the drone. For example, the user computing device may cause the drone to navigate, collect sensor data, and/or activate the response device.

Exemplary Embodiments

In one aspect, a home monitoring drone may be a small aircraft that may be automatically deployed to monitor homes or other property, and fight fires or otherwise mitigate damage. The smart drone may be integrated with s smart home controller, or act as a stand-alone monitoring solution.

If working as a stand-alone system, the drone may automatically navigate and survey the property using onboard sensors. If anything is found out of place, an alert may be sent to the owner, such as via their mobile device. The owner, from their mobile device, may choose to take control, continue monitoring, or alert emergency services.

If integrated into a smart home controller, the drone may be activated when an alert is received from a smart home controller. Using location/zone information received from the smart home controller, the drone may navigate to the site of the breech/alert. The owner, from their mobile device, may choose to take control, continue monitoring, or alert emergency services.

The drone may also be able to locate and fight fires by carrying a fire extinguisher or fire extinguishing chemicals. For instance, the drone may be a land-based robot that carries a small fire extinguisher. The drone may use a 3D camera to facilitate mapping the environment and assisting with navigation. The drone may automatically respond to signals transmitted from the smart home controller, and travel to the source of the alarm to begin monitoring.

The present embodiments may facilitate data streaming via a mobile device App. The mobile device App or application may alert the owner of the property, allow the owner to monitor their property virtually, and/or alert emergency responders, if need be. When a fire or other event is detected, the drone can respond to the affected area and use its onboard fire extinguisher or other mechanisms to control the fire. The owner may have the ability to remotely activate and control the drone, and monitor the property at will.

Figure 7:
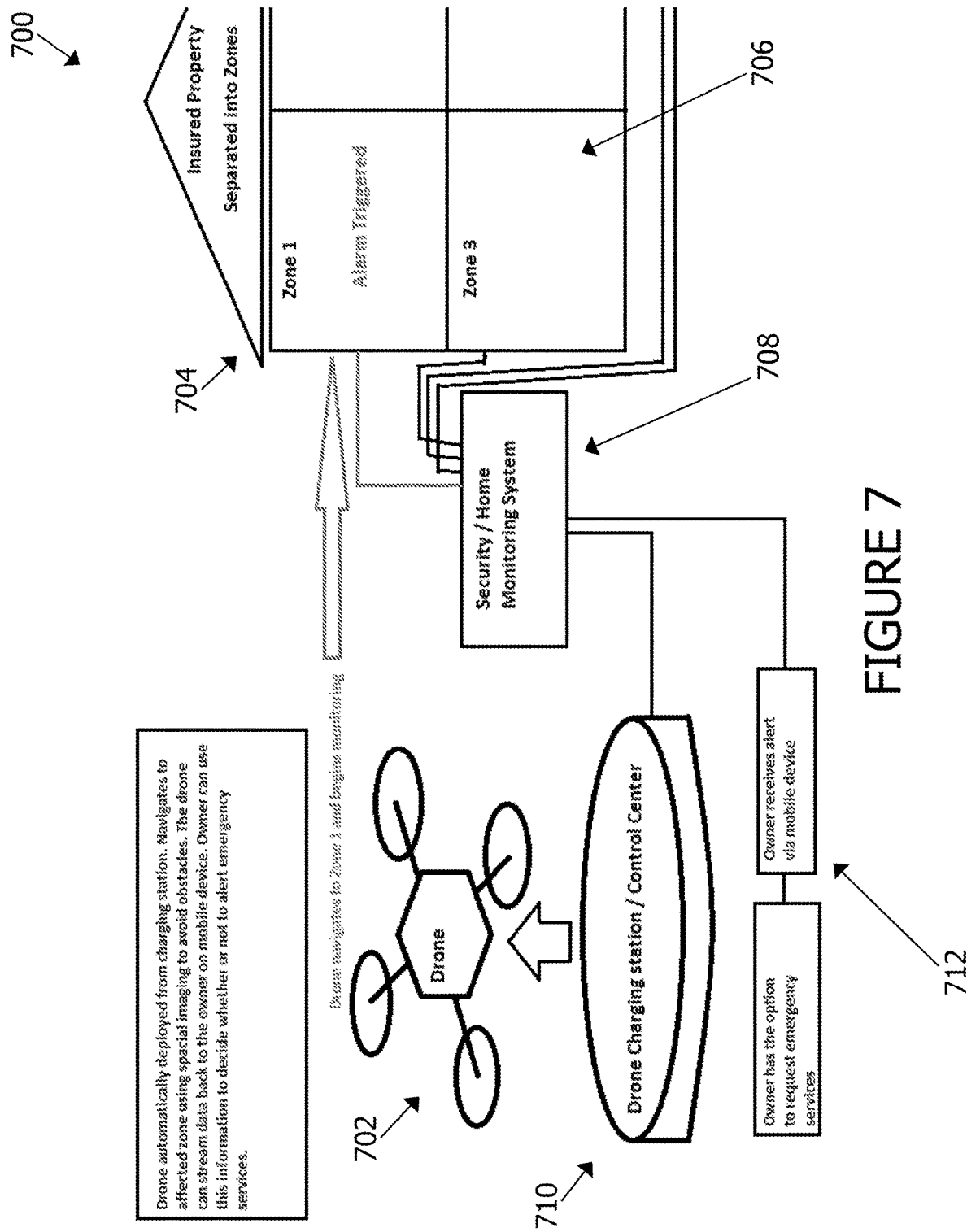
FIG. 7 is an exemplary computer system involving an autonomous drone, charging station, and smart home controller.

FIG. 7 depicts an exemplary computer system 700 that directs an autonomous drone 702 to mitigate home damage. The computer system 700 may include an insured property 704 that is separated into multiple zones 706, and a smart home system or controller 708. The smart home system or controller 708 may be in wired or wireless communication with various sensors mounted about the insured property 704, and/or include a home security system.

The smart home controller 708 may also be in wired or wireless communication with a drone charging station/control center 710 and/or the insured's mobile device 712. The smart home controller 708 may detect that an alarm has been triggered. The smart home controller 708 may then wirelessly communicate with the autonomous drone 702, the drone charging station 710, and/or the insured's mobile device 712. The autonomous drone 702 may be automatically deployed from the charging station 710. The autonomous drone 702 may navigate to the affected zone within the property 704 using, for example, dead reckoning and/or spacial imaging to avoid obstacles. The autonomous drone 702 may stream data back to the insured or property 704 owner on their mobile device 712. The owner or insured may use this information to decide whether or not to alert emergency services.

The autonomous drone 702 may be directed or navigated to an impacted zone and begin monitoring under the direction or control of one or more remote or local processors, such as one or more processors associated with, or mounted on, the drone 702, mobile device 712, drone charging station/control center 710, and/or security/home monitoring system or smart home controller 708. Navigation maps of the home may be pre-built or built in real-time via the drone 702, home-mounted sensor data, and/or drone-mounted sensor data. The drone charging station 710 may include a port that allows the drone 702 to dock automatically, and to wirelessly charge one or more drone-mounted batteries.

In one aspect, an autonomous drone for mitigating home damage may be provided. The autonomous drone may include one or more processors, sensors, or transceivers configured to: (1) receive, from a smart home controller, via wireless communication or data transmission, directions or commands directing the autonomous drone to an impacted zone within a property, the impacted zone being associated with an insurance-related event, the insurance-related event being detected by a home monitoring system; (2) receive, via wireless communication or data transmission from the smart home controller, a navigation map of the interior of the property, or retrieve the navigation map of the interior of the property from an on-board memory unit that is mounted on the autonomous drone, the navigation map of the interior of the property indicating a location of the impacted zone; (3) navigate the drone to the impacted zone using the navigation map and/or sensor data collected from one or more drone-mounted sensors or home-mounted sensors; (4) verify or determine an abnormal condition exists at the impacted zone via sensor data collected from the one or more drone-mounted sensors; and/or (5) generate and transmit (via wireless communication or data transmission over one or more radio frequency links) a notification that the abnormal condition exists at the impacted zone of the property, or generate and transmit (via wireless communication or data transmission over one or more radio frequency links) one or more recommended actions to a mobile device of a customer to facilitate mitigating or preventing home damage. The autonomous drone may be configured to have additional, less, or alternate functionality, including that discussed elsewhere herein.

The insurance-related event may cause fire or water damage to the property. The insurance-related event may be a fire, break-in, or water leak. The insurance-related event may be originally detected by a smoke, fire, heat, infrared, moisture, water, door-mounted, window-mounted, audio, image, light, temperature, or infrared sensor mounted on the property, and in wired or wireless communication with the home monitoring system. The insurance-related event may be subsequently verified by a smoke, fire, heat, infrared, moisture, water, door-mounted, window-mounted, audio, image, light, temperature, or infrared sensor mounted on the drone.

The one or more recommended actions may include deployment or activation of a fire extinguisher mounted on the autonomous drone, or deployment or activation of a wall or stove-mounted fire extinguisher; or activation of a water main electronically controlled valve to supply water to a fire, or to shut off the supply of water to an area associated with a water leak. The one or more recommended actions or notifications sent to the mobile device ask the customer if they would like to deploy or activate a wall, fire place, oven, or stove-mounted fire extinguisher; or activate a water main electronically controlled (e.g., solenoid) valve to supply water to a fire, or to shut off the supply of water to an area associated with a water leak.

The one or more recommended actions may include contacting emergency responders or vehicles, such as a fire department or police. The autonomous drone may be an unmanned, autonomous aerial vehicle or an unmanned, autonomous land-based robotic rover.

The autonomous drone may be configured to autonomously deploy and land at a drone re-charging station that wirelessly recharges one or more batteries mounted on the autonomous drone. The autonomous drone may be configured to generate a flight path about the property; detect obstacles within the flight path; alter the flight path to have the autonomous drone avoid the obstacles; and/or direct the autonomous drone to travel about the property in accordance with the altered flight path to avoid the obstacles. The autonomous drone may be configured to: collect or generate sensor data from the one or more drone-mounted sensors, the sensor data being associated with the impacted area within the property before, during, and/or after the insurance-related event; estimate an amount of damages to the property and/or insured personal articles from computer analysis of the sensor data (such as by using object recognition or pattern recognition techniques on the sensor data), or input the sensor data into a machine learning program that is trained to determine or estimate damages to property and/or personal articles; and/or generate a proposed insurance claim based upon the estimate amount of damages for the insured's review, approval, and/or modification.

The autonomous drone may be configured to: prior to the insurance related event, collect or generate sensor data from the one or more drone-mounted sensors, the sensor data being associated with the interior of the property and personal articles before an insurance-related event; estimate a replacement cost or value of the property, property features (or characteristics, such as flooring, fire place, cabinetry, size of rooms, number of rooms or floors) and/or insured personal articles from computer analysis of the sensor data (such as by using object recognition or pattern recognition techniques on the sensor data), or input the sensor data into a machine learning program that is trained to determine or estimate the replacement cost or value of the property, property features, and/or personal articles; and/or generate an insurance quote for homeowners and/or personal articles insurance based upon the estimate amount of damages for the insured's review, approval, and/or modification.

In another aspect, an autonomous drone for mitigating home damage may be provided. The autonomous drone may include one or more processors, sensors, or transceivers configured to: (1) receive, from a smart home controller, via wireless communication or data transmission, directions or commands directing the autonomous drone to periodically navigate to one or more predetermined locations within a property, and monitor or otherwise look for abnormal conditions at the one or more predetermined locations; (2) receive, via wireless communication or data transmission from the smart home controller, a navigation map of the interior of the property, or retrieve the navigation map of the interior of the property from an on-board memory unit that is mounted on the autonomous drone, the navigation map of the interior of the property indicating a location of the impacted zone; (3) navigate the drone to the one or more predetermined locations using the navigation map, and/or sensor data collected from one or more autonomous drone-mounted sensors or home-mounted sensors; (4) collect or generate sensor data from the one or more autonomous drone-mounted sensors while at the one or more predetermined locations; (5) input the sensor data into a machine learning program that is trained to identify abnormal conditions, or otherwise determine that an abnormal condition exists at a predetermined location via the sensor data collected from the one or more autonomous drone-mounted sensors; and/or (6) generate and transmit (via wireless communication or data transmission over one or more radio frequency links) a notification that the abnormal condition exists at the impacted zone of the property, or generate and transmit (via wireless communication or data transmission over one or more radio frequency links) one or more recommended actions to a mobile device of a customer to facilitate mitigating or preventing home damage. The autonomous drone may be configured to have additional, less, or alternate functionality, including that discussed elsewhere herein.

In another aspect, a computer-implemented method of using an autonomous drone to mitigate home damage may be provided. The autonomous drone may include one or more processors, sensors, or transceivers. The method may include (1) receiving, at or by one or more drone-mounted processors from a smart home controller, via wireless communication or data transmission, directions or commands directing the autonomous drone to an impacted zone within a property, the impacted zone being associated with an insurance-related event, the insurance-related event being detected by a home monitoring system; (2) receiving, at or by the one or more drone-mounted processors via wireless communication or data transmission from the smart home controller, a navigation map of the interior of the property, or retrieving, at or by the one or more drone-mounted processors, the navigation map of the interior of the property from an on-board memory unit that is mounted on the autonomous drone, the navigation map of the interior of the property indicating a location of the impacted zone; (3) navigating, via the one or more drone-mounted processors, the autonomous drone to the impacted zone using the navigation map, and/or sensor data collected from one or more drone-mounted sensors or home-mounted sensors; (4) verifying or determining, via the one or more drone-mounted processors, that an abnormal condition exists at the impacted zone via the sensor data collected from the one or more drone-mounted sensors; and/or (5) generating and transmitting (via wireless communication or data transmission over one or more radio frequency links) a notification that the abnormal condition exists at the impacted zone of the property, or generating and transmitting (via wireless communication or data transmission over one or more radio frequency links) one or more recommended actions to a mobile device of a customer to facilitate mitigating or preventing home damage. The method may include one or more additional, less, or alternate actions, including those discussed elsewhere herein.

For instance, the insurance-related event may cause fire or water damage to the property, or be a fire, break-in, or water leak. The insurance-related event may be detected (or verified) by a smoke, fire, heat, infrared, moisture, water, door-mounted, window-mounted, audio, image, light, temperature, or infrared sensor mounted on the property (or drone mounted sensor) and in wired or wireless communication with the home monitoring system.

The one or more recommended actions may include deployment or activation of a fire extinguisher mounted on the autonomous drone. The one or more recommended actions include deployment or activation of a wall or stove-mounted fire extinguisher; or activation of a water main electronically controlled valve to supply water to a fire, or to shut off the supply of water to an area associated with a water leak. The one or more recommended actions or notifications to the mobile device may ask the customer if they would like to deploy or activate a wall, fire place, oven, or stove-mounted fire extinguisher; or activate a water main electronically controlled (e.g., solenoid) valve to supply water to a fire, or to shut off the supply of water to an area associated with a water leak. The one or more recommended actions may include contacting emergency responders or vehicles, such as a fire department or police. The autonomous drone may be an unmanned, autonomous aerial vehicle or an unmanned, autonomous land-based robotic rover.

The autonomous drone may be configured to autonomously deploy and land at a drone re-charging station that wirelessly recharges one or more batteries mounted on the autonomous drone. The method may include, via the one or more drone-mounted processors, (i) generating a flight path about the property; (ii) detecting obstacles within the flight path; (iii) altering the flight path to have the autonomous drone avoid the obstacles; and/or (iv) directing the autonomous drone to travel about the property in accordance with the altered flight path to avoid the obstacles.

The method may include, via the one or more drone-mounted processors or sensors: (i) collecting or generating sensor data from the one or more drone-mounted sensors, the sensor data being associated with the impacted area within the property before, during, and/or after the insurance-related event; (ii) estimating an amount of damages to the property and/or insured personal articles from computer analysis of the sensor data (such as by using object recognition or pattern recognition techniques on the sensor data), or inputting the sensor data into a machine learning program that is trained to determine or estimate damages to property and/or personal articles; and/or (iii) generating a proposed insurance claim based upon the estimate amount of damages for the insured's review, approval, and/or modification.

The method may include, via the one or more drone-mounted processors or sensors: (i) prior to the insurance related event, collecting or generating sensor data from the one or more drone-mounted sensors, the sensor data being associated with the interior of the property and personal articles before an insurance-related event; (ii) estimating a replacement cost or value of the property, property features (or characteristics, such as flooring, fire place, cabinetry, size of rooms, number of rooms or floors) and/or insured personal articles from computer analysis of the sensor data (such as by using object recognition or pattern recognition techniques on the sensor data), or inputting the sensor data into a machine learning program that is trained to determine or estimate the replacement cost or value of the property, property features, and/or personal articles; and/or (iii) generating an insurance quote for homeowners and/or personal articles insurance based upon the estimate amount of damages for the insured's review, approval, and/or modification.

In another aspect, a computer-implemented method of using an autonomous drone to mitigate home damage may be provided. The autonomous drone may include one or more processors, sensors, or transceivers. The method may include: (1) receiving, at or by one or more drone-mounted processors or transceivers from a smart home controller, via wireless communication or data transmission, directions or commands directing the autonomous drone to periodically navigate the drone to one or more predetermined locations within a property, and monitor or otherwise look for abnormal conditions at the one or more predetermined locations; (ii) receiving, at or by the one or more drone-mounted processors or transceivers, via wireless communication or data transmission from the smart home controller a navigation map of the interior of the property, or retrieving, via the one or more drone-mounted processors, the navigation map of the interior of the property from an on-board memory unit that is mounted on the autonomous drone, the navigation map of the interior of the property indicating a location of the impacted zone; (iii) navigating the drone, via the one or more drone-mounted processors, to the one or more predetermined locations using the navigation map, and/or sensor data collected from one or more autonomous drone-mounted sensors or home-mounted sensors; (iv) collecting or generating, via one or more drone-mounted sensors, sensor data from the one or more autonomous drone-mounted sensors while at the one or more predetermined locations; (v) inputting, via the one or more processors, the sensor data into a machine learning program that is trained to identify abnormal conditions, or otherwise determining, via the one or more processors, that an abnormal condition exists at a predetermined location via the sensor data collected from the one or more autonomous drone-mounted sensors; and/or (vi) generating and transmitting (via wireless communication or data transmission over one or more radio frequency links), via the one or more drone-mounted processors or transceivers, a notification that the abnormal condition exists at the impacted zone of the property, or generating and transmitting (via wireless communication or data transmission over one or more radio frequency links), via the one or more drone-mounted processors or transceivers, one or more recommended actions to a mobile device of a customer to facilitate mitigating or preventing home damage. The method may include additional, less, or alternate actions, including those discussed elsewhere herein.

In one aspect, a drone for detecting incidents within a coverage area including a plurality of zones may be provided. The drone may include a processor, a memory in communication with the processor, and/or a sensor. The processor may be programmed to (1) detect a triggering activity associated with a first zone of the zones; (2) determine a navigation path to the first zone; (3) travel to the first zone based upon the determined navigation path; (4) collect sensor data using the sensor at the first zone; and/or (5) transmit the collected sensor data to a user computing device associated with the coverage area for review. The drone may include additional, fewer, or alternative components and/or functions, including those described elsewhere herein.

In another aspect, a computer-based method for detecting incidents within a coverage area including a plurality of zones may be provided. The method may be at least partially performed by a drone. The method may include (1) detecting a triggering activity associated with a first zone of the zones; (2) determining a navigation path to the first zone; (3) traveling to the first zone based upon the determined navigation path; (4) collecting sensor data using a sensor at the first zone; and/or (5) transmitting the collected sensor data to a user computing device associated with the coverage area for review. The method may include additional, fewer, or alternative steps, including those described elsewhere herein, and may be implemented via one or more autonomous drones and/or local or remote processors, sensors, and/or transceivers.

In yet another aspect, at least one non-transitory computer-readable storage media having computer-executable instructions embodied thereon for detecting incidents within a coverage area including a plurality of zones may be provided. When executed by at least one processor, the computer-executable instructions may cause the processor to detect a triggering activity associated with a first zone of the zones; determine a navigation path to the first zone; travel to the first zone based upon the determined navigation path; collect sensor data using a sensor communicatively coupled to the processor at the first zone; and/or transmit the collected sensor data to a user computing device associated with the coverage area for review. The computer-executable instructions may cause the processor to perform additional, fewer, or alternative functions, including those described elsewhere herein.

In yet another aspect, at least one non-transitory computer-readable storage media having computer-executable instructions embodied thereon for generating an inventory list using a response system including an autonomous drone may be provided. When executed by at least one processor, the computer-executable instructions may cause the processor to build a virtual map of a coverage area, store the virtual map in a memory associated with the drone, receive a deployment signal, deploy the drone in response to the deployment signal, control movement of the drone within the coverage area using the virtual map, collect sensor data of the coverage area using the sensor, and/or analyze the sensor data to generate an inventory list of the coverage area, the inventory list including a personal article within the coverage area. The computer-executable instructions may cause the processor to perform additional, fewer, or alternative functions, including those described elsewhere herein.

In another aspect, a response system may be provided. The response system may include a security system and an autonomous drone. The security system includes a security sensor and a controller. The drone includes a processor, a memory in communication with the processor, and a drone sensor. The processor may be programmed to link the drone to the controller, build a virtual navigation map of the coverage area based, at least in part, upon initial sensor data stored by the drone, determine that the coverage area is unoccupied, deploy the drone from a docking station, control movement of the drone within the coverage area based upon the virtual navigation map, collect drone sensor data of the coverage area using the drone sensor, and/or analyze the collected drone sensor data to identify an abnormal condition within the coverage area, the abnormal condition including at least one of damage or theft occurring within the coverage area. The response system may include addition, fewer, or alternative components and/or functions, including those described elsewhere herein.

In a further aspect, a computer-implemented method for analyzing sensor data of a coverage area using a response system may be provided. The response system may include an autonomous drone and a security system including a controller. The method includes linking the drone to the controller, building a virtual navigation map of the coverage area based, at least in part, upon initial sensor data stored by the drone, determining that the coverage area is unoccupied, deploying the drone from a docking station, navigating, by the drone, through the coverage area based upon the virtual navigation map, collecting, by the drone, drone sensor data of the coverage area using a drone sensor, and/or analyzing the collected drone sensor data to identify an abnormal condition within the coverage area, the abnormal condition including at least one of damage or theft occurring within the coverage area. The method may include additional, fewer, or alternative steps, including those described elsewhere herein, and may be implemented via one or more autonomous drones and/or local or remote processors, sensors, and/or transceivers.

In another aspect, at least one non-transitory computer-readable storage media having computer-executable instructions embodied thereon for analyzing sensor data of a coverage area using a response system, the response system including a drone and a security system including a controller may be provided. When executed by at least one processor, the computer-executable instructions may cause the processor to link the drone to the controller, build a virtual navigation map of the coverage area based, at least in part, upon initial sensor data stored by the drone, determine that the coverage area is unoccupied, deploy the drone from a docking station, navigate the coverage area based upon the virtual navigation map, collect sensor data of the coverage area using the drone sensor, and/or analyze the collected sensor data to identify an abnormal condition within the coverage area, the abnormal condition including at least one of damage or theft occurring within the coverage area. The computer-executable instructions may cause the processor to perform additional, fewer, or alternative functions, including those described elsewhere herein.

Machine Learning

As indicated above, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as drone data; drone-mounted or home-mounted sensor data; mobile device sensor data; and/or image or radar data) in order to facilitate making predictions for subsequent data (again, such as drone data; drone-mounted or home-mounted sensor data, mobile device sensor data; and/or image or radar data). Models may be created based upon example inputs of data in order to make valid and reliable predictions for novel inputs.

Additionally or alternatively, the machine learning programs may be trained by inputting sample data sets or certain data into the programs, such as drone, drone-mounted sensor, mobile device-mounted sensor, and/or home-mounted sensor data, smart home controller data, and other data discuss herein. The machine learning programs may utilize deep learning algorithms are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the sensed items, such as fires, break-ins, or water leaks, using data generated by one or more drone-mounted sensors, and determine under what conditions those items were encountered.

Additionally, the machine learning programs may be trained with drone-mounted sensor data, home-mounted sensor data, mobile device sensor data, smart home controller data, and/or other sensor data to identify abnormal conditions (e.g., fires or water leaks); estimate damage to a property, property features, or personal articles; estimate repair or replacement costs for properties, property features, or personal articles; estimate insurance quotes for properties, property features, or personal articles; generate navigation maps; identify flight paths and obstacles within properties; determine corrective actions (de-energize circuits, control smart water valves, control smart fire extinguishers); determine recommendations; generate proposed insurance claims for insureds after an insurance-related event; and/or other actions discussed herein.

Exemplary Autonomous Drone Sensor Data Collection

Figure 8:
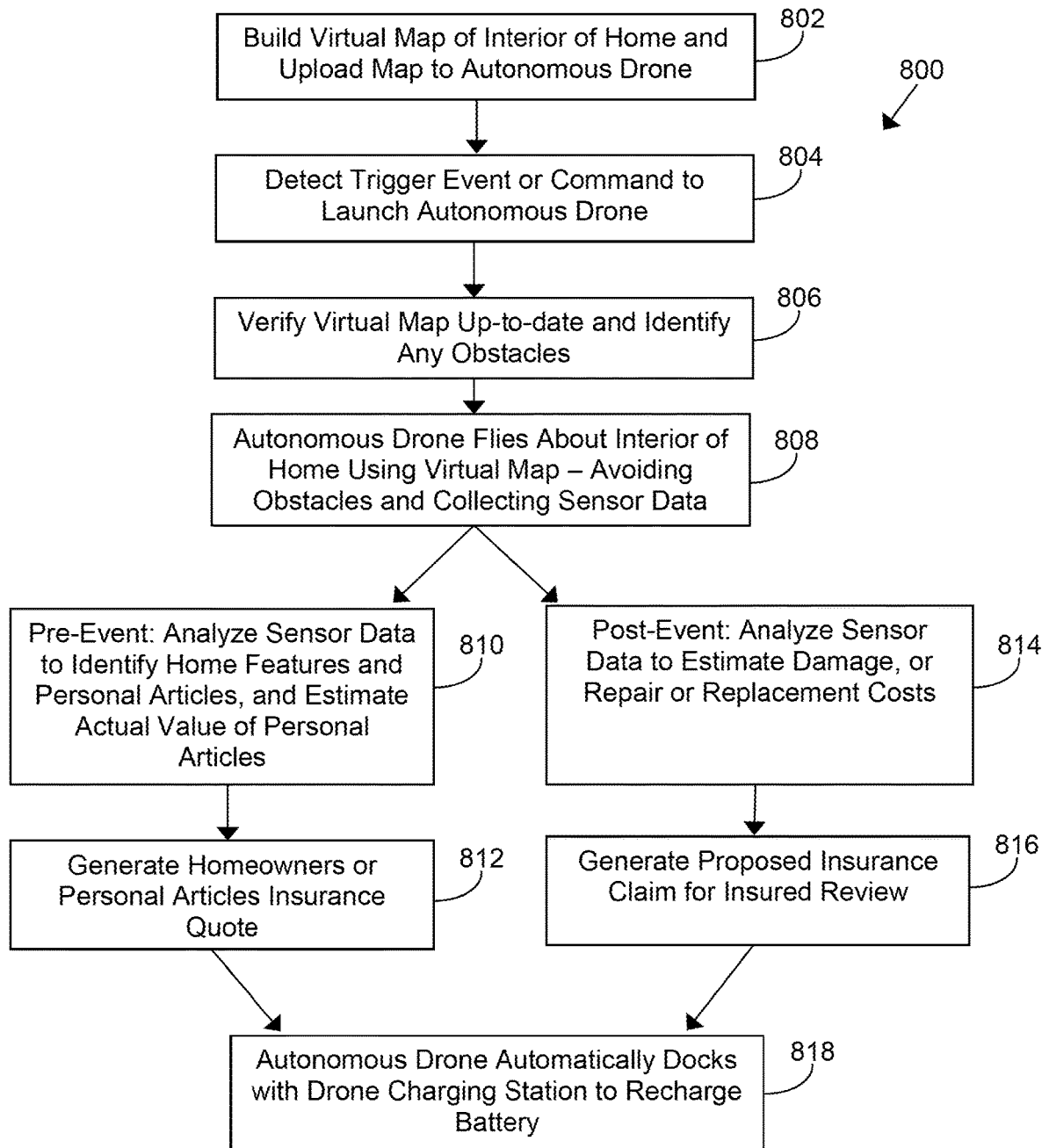
FIG. 8 is an exemplary computer-implemented method of using autonomous drones to collect sensor data for insurance-related purposes that may be implemented by the system shown in FIG. 1.

FIG. 8 is an exemplary computer-implemented method 800 of using autonomous drones to collect sensor data for insurance-related purposes. The method 800 may be implemented using system 100 (shown in FIG. 1). The method 800 may include building or generating 802 a virtual map of the interior of a home (i.e., a coverage area). For instance, the virtual map may be generated using floor plans or layouts; home-mounted sensor data; video or image data; mobile device-mounted sensor or camera data; and/or 3D imaging device or techniques. The virtual map may be uploaded to a memory unit mounted on the autonomous drone. For instance, the virtual map may reside on a memory unit associated with a smart home controller or a drone charging station, and may be transmitted from the smart home controller or drone charging station to the autonomous drone for storage thereon via a wireless communication channel or radio frequency link. The virtual map is stored in a memory associated with the drone after the map is generated.

The method 800 may include detecting a trigger event and launching the autonomous drone 804. For instance, a trigger event may be a home-mounted sensor detecting an abnormal condition—such as abnormal water, leakage, smoke, break-in, or fire. The trigger event may also be a wireless command ("deployment signal") from a customer user device directing the autonomous drone to deploy. The deployment signal may be periodically transmitted to the drone after a predetermined period of time to enable the drone to periodically deploy and collect updated sensor data. In at least some embodiments, the drone may be configured to receive the deployment signal to deploy and collect initial sensor data associated with the coverage area to build the virtual map or to create an inventory list as described herein. After the trigger event is detected or an indication of the trigger event wirelessly or wiredly received, the autonomous drone may deploy or launch.

The method 800 may include performing 806 some initial checks by the autonomous drone after power up, but prior to, or immediately after, launch or becoming airborne. For instance, the autonomous drone may run various self or system checks after power up; verify the virtual map of the home is current or up-to-date, or otherwise a recent version; and/or identify an any obstacles within visual range (such as by analyzing image data using object recognition techniques). After the initial checks are satisfied, a drone charging station may unlatch, deploy, or otherwise release the drone from a charging or resting position.

The method 800 may include the autonomous drone traveling or flying 808 about the interior of the home using the virtual map (for an aerial drone). A land-based rover or drone may move about the floor of the home using the virtual map. In at least some embodiments, the drone may travel to a location within the home that is associated with the trigger event. The autonomous drone may identify obstacles (such as chairs, furniture, light fixtures, etc.) using object recognition techniques from image data gather via a drone-mounted camera, for instance. If an obstacle is blocking the drone's path, the drone may automatically adjust its travel or navigation path to avoid the obstacle. The autonomous drone may collect sensor data as it flies or otherwise moves about the home, such as data from cameras, radar units, audio recorders, infrared sensors, 3D imaging sensors, heat sensors, or other sensors mounted on the autonomous drone. The drone may analyze the sensor data or transmit the sensor data to another computing device for analysis to identify any abnormal conditions or other information associated with the coverage area.

The map itself may include dimensions of rooms and ceiling height. The autonomous drone may determine its position within each room using ranging techniques, such as using radar or 3D imaging to determine a distance to the floor, ceiling, and/or each wall. The autonomous drone (if an aerial drone) may fly by keeping a safe distance from each wall or the ceiling, such as by maintaining 12-18 inch safety distance to avoid collision. The autonomous drone (either an aerial or land-based based drone or robot) may also navigate or maintain its known position within a home using dead reckoning (DR) techniques, or being in wireless communication with home-mounted sensors that are located in known rooms or at known coordinates. The autonomous drone may also navigate and/or maintain its position in relation to the virtual map using triangulation techniques with home-mounted sensors that are within wireless communication range.

The method 800 may include performing 810 one or more pre-event actions. For instance, autonomous drone may analyze the sensor data collected (before an event) remotely, or alternatively, the autonomous drone sensor data may be transmitted to a smart home controller or a remote server, and then analyzed remotely. As used herein, an "event" may include abnormal conditions and/or damage or theft resulting from the abnormal conditions. The drone sensor data may be analyzed to identify home features or characteristics ("coverage area characteristics")—such as size of rooms; number of rooms or baths; type of counter tops, cabinetry, flooring, roofing, siding, lighting, fire place, etc. The drone sensor data may be analyzed to identify personal articles or belongings, and calculate an actual value amount or other value amount of each personal articles. Virtual inventory lists of the home characteristics and/or the personal articles may be built and/or updated. For instance, the drone sensor data may be input to a machine learning program that is trained using sample data to (i) identify home characteristics and personal articles (such as by using object recognition or pattern recognition techniques on image data acquired by a camera mounted on the autonomous drone), and/or (ii) calculate an actual value amount or replacement cost for each home feature or personal article. The inventory lists may be stored by the drone and/or another computing device in communication with the drone (e.g., the docking station or home controller).

In the exemplary embodiment, the drone may be configured to collect sensor data including image or video data and identify the home characteristics and personal articles from the sensor data. Each entry within the inventory list may include a list identifier and image (or video) data of the respective home characteristic or personal article. In some embodiments, the drone may have access to a master inventory list or an image recognition application to identify the characteristics or articles. For example, the drone may compare the collected image data to image data from the master inventory list to determine what the collected image data represents. The list identifier may be used to identify the characteristic or article during subsequent access of the inventory list. For example, for a television, the list identifier may indicate that the article is a television and a brand or model of the television. In some embodiments, the drone may retrieve a value amount associated with the characteristic or article based upon the list identifier. In addition to identifying the home characteristics and personal articles, the drone may store a position or location of each entry within the inventory list to facilitate detecting theft or damage after an event. The virtual map may be updated with the positions of the entries in the inventory list.

The pre-event actions may also include generating 812 a homeowners, renters, or personal articles insurance quote. The quote for insurance may be based in part on the home features and/or personal articles identified, and/or their calculated actual value amount or replacement cost.

The method 800 may include performing one or more post-event actions. For instance, the autonomous drone may be configured to capture claim data after or during an event using the sensor and analyze the captured claim data remotely, or alternatively, the claim data may be transmitted to a smart home controller or a remote server, and then analyzed remotely. The claim data may be analyzed to identify or estimate damage, theft, and/or repair or replacement costs for damaged or stolen home characteristics and/or personal articles. For instance, the claim data may be input to a machine learning program that is trained using sample data to (i) estimate damage to home characteristic and personal articles (such as by using object recognition or pattern recognition techniques on image data acquired by a camera mounted on the autonomous drone), and/or (ii) calculate a repair or replacement cost for each home characteristic or personal article. The pre-event and post-event actions set forth above may be collectively referred to as "insurance events".

In the exemplary embodiment, the drone may retrieve the stored inventory list and compare the inventory list to the claim data to identify damage and/or theft. The inventory list may be updated indicate a status of the characteristic or article, such as "damaged", "stolen", "damaged—repairable", and/or "damaged—unrepairable". In some embodiments, the drone may retrieve the calculated value amount or repair cost associated with a characteristic or article from the inventory list to calculate a repair or damage cost from the claim data. In certain embodiments, the drone may transmit the captured claim data to an insurance computing device for analysis.

The post-event actions may also include generating 816 a proposed insurance claim related to homeowners, renters, or personal articles insurance associated with the coverage area. The proposed insurance claim may be based in part on the home characteristics and/or personal articles identified as being damaged, and/or their estimated repair or replacement cost.

The method 800 may include directing 818 the autonomous drone back to a drone charging station. The autonomous drone may automatically dock with the drone charging station. The drone charging station may then wirelessly recharge one or more batteries mounted on the autonomous drone to facilitate further autonomous drone actions. The method 800 may include additional, less, or alternate actions, including those discussed elsewhere herein, and may be implemented via one or more local or remote processors, transceivers, and/or sensors. Although the drone performs the actions of method 800, it is to be understood that the drone charging station, the home controller, and/or the insurance computing device may be configured to perform at least a portion of method 800.

Exemplary Autonomous Drone Periodic Deployment

Figure 9:
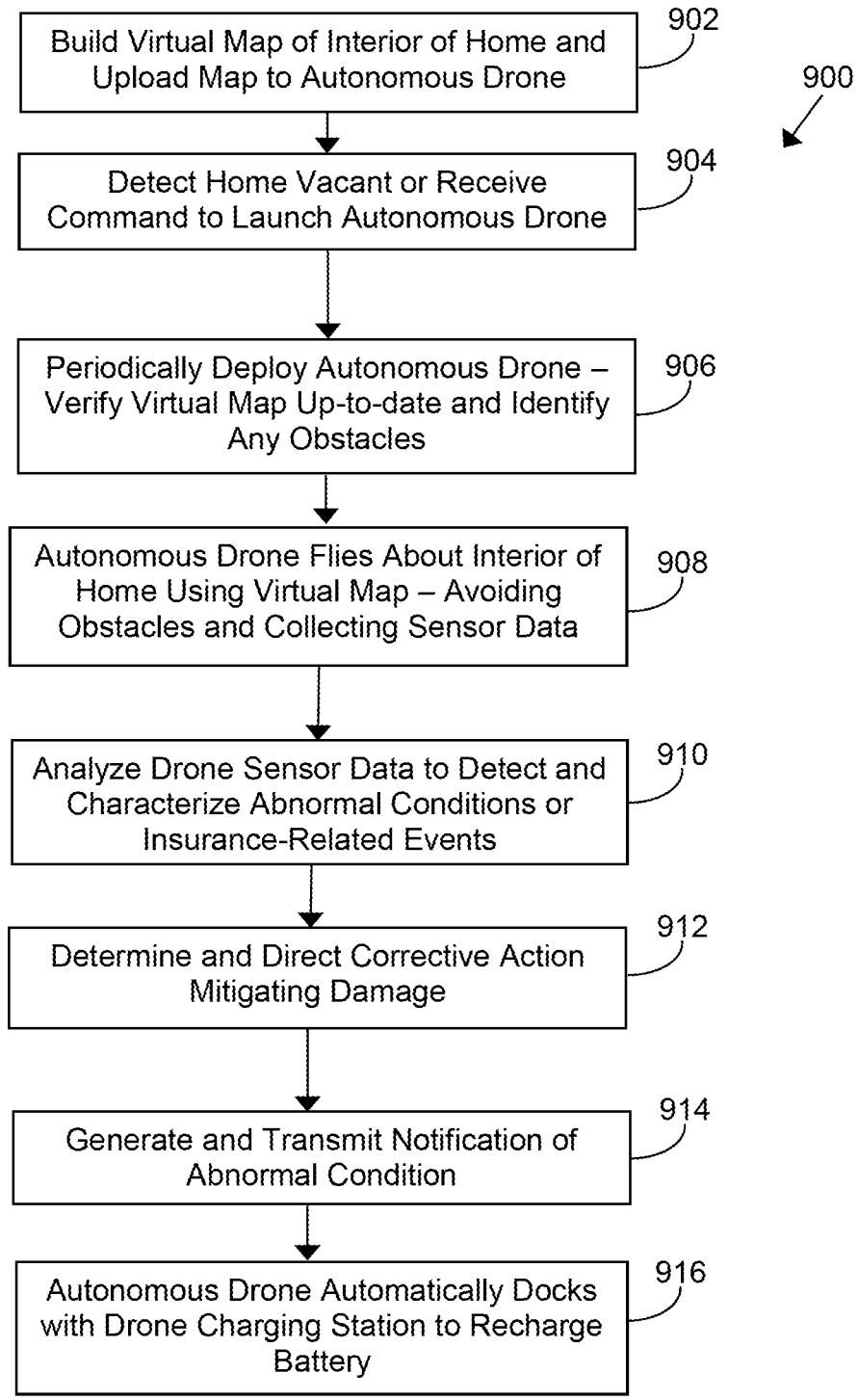
FIG. 9 is an exemplary computer-implemented method of employing autonomous drones to collect sensor data, analyze the sensor data to detect abnormal conditions, and, in response, direct mitigating actions that may be implemented by the system shown in FIG. 1.

FIG. 9 is an exemplary computer-implemented method 900 of employing autonomous drones to collect sensor data, analyze the sensor data to detect abnormal conditions, and, in response, direct mitigating actions. The method 900 may be implemented by system 100 (shown in FIG. 1). The method 900 may include generating or building 902 a virtual map of the interior of a home, and uploading the virtual map to memory unit mounted-on the autonomous drone.

The method 900 may include detecting 904 that a home is unoccupied. For instance, home-mounted sensors may determine that a home is unoccupied by lack of infrared heat signatures, or lack of motion detected by motion sensors. Mobile device or vehicle GPS location may be used to determine that an insured has left the house. Also, door locks and sensors, or garage door sensors may be used to determine when occupants have left home. If is determined that the home is unoccupied, a smart home controller or drone control center may push a notification to a user's mobile device asking if they would like for the autonomous drone to periodically deploy and check the home for abnormal conditions. A user may direct the autonomous drone to periodically deploy (e.g., deploy once every few hours) by pressing an icon on their mobile device.

The method 900 may include the autonomous drone periodically deploying 906. For instance, every couple of hours the autonomous drone may power up, perform several self-checks to verify proper operation, verify that the virtual map of the house is up-to-date or a current version, and/or identify any obstacles within view.

The method 900 may include the autonomous drone traveling 908 about the home using one or more routes. The autonomous drone may fly if an aerial drone, or may move about the floor if the drone is a rover. The routes may be determined using the virtual map, and may be selected to avoid any known obstacles (e.g., stairs, lights, furniture). The autonomous drone may also collect and analyze sensor data as it moves about the home to detect obstacles in real-time.

The method 900 may include analyzing 910 the drone sensor data collected to detect and characterize abnormal conditions or insurance-related events. For instance, image, infrared, or radar data may be collected and analyzed to identify unexpected smoke, water, leakage, fires, open windows or doors, etc.

The method 900 may include determining or directing 912 a corrective action to mitigate damage to the house and/or personal belongings therein. For instance, a processor or controller mounted on the autonomous drone, or home controller or remote processor in wireless communication with the autonomous drone may identify a type of event or damage caused by the event (such as a water or leakage event). The local or remote processor may determine that a water main or electronically controlled water inlet valve should be closed to isolate or stop the water damage. The processor may remotely direct the valve to shut, mitigating further water damage. As another example, the local or remote processor may direct that a sprinkler system operate after smoke or fire is detected.

The method 900 may include generating and transmitting 914 an electronic notification of abnormal condition. For instance, the autonomous drone may generate and transmit a message to the user's mobile device or to a third party's remote server (e.g., police department, fire department, or home security company). The autonomous drone may generate messages presenting recommended actions (e.g., shut off power to home, shut water valve, etc.), and asking whether the user would like those actions to be automatically performed or not.

The method 900 may include automatically docking 916 the autonomous drone with the drone charging station to recharge the battery. The autonomous drone's battery or batteries may be wirelessly charged from the drone charging station for the next drone deployment. The method may include additional, less, or alternate actions, including those discussed elsewhere herein.

Exemplary Integration of Autonomous Drone into Home Security System

Figure 10:
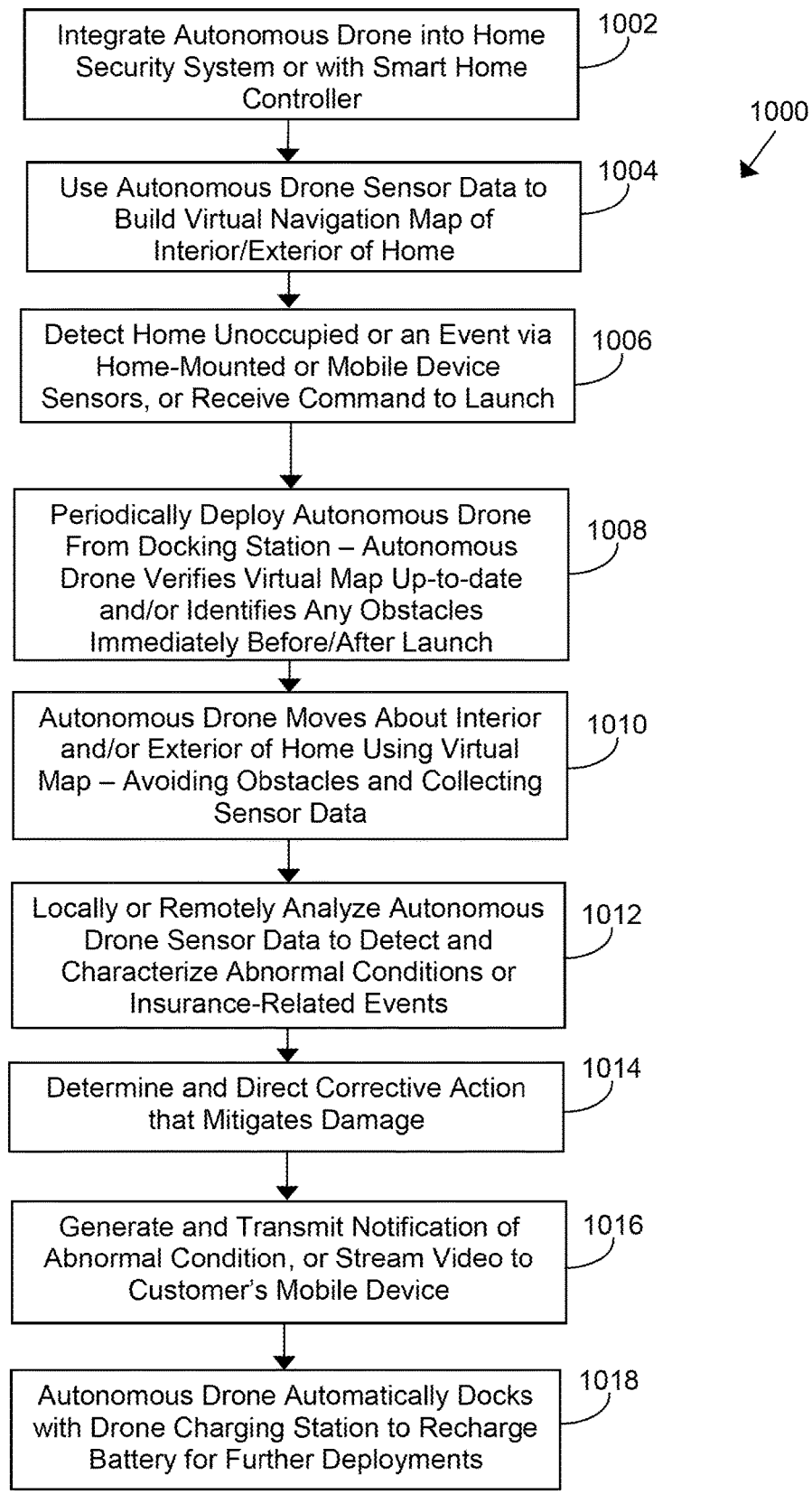
FIG. 10 is an exemplary computer-implemented method of integrating an autonomous drone into a home monitoring/security system, and then employing the autonomous drone to monitor the home by collecting sensor data, analyzing the sensor data to detect abnormal conditions, and directing mitigating actions that may be implemented by the system in FIG. 1.

FIG. 10 is an exemplary computer-implemented method 1000 of integrating an autonomous drone into a home monitoring/security system, and then employing the autonomous drone to monitor the home by collecting sensor data, analyzing the sensor data to detect abnormal conditions, and directing mitigating actions. The method 1000 may be implemented by system 100 (shown in FIG. 1). The method 1000 may include integrating or linking 1002 an autonomous drone into a home security system. For instance, the autonomous drone may be linked a processor associated with a home security system, or a "smart home" or interconnected home controller. The linking may be via wireless communication or data transmission over a radio frequency link or via a wireless communication channel to allow two-way data transmission.

The method 1000 may include using 1004 initial drone sensor data to build a virtual navigation map of the interior and/or exterior of the home. For instance, the initial time that the autonomous drone flies or otherwise moves about the home, sensor data may be collected in real-time. The drone sensor data may be used for obstacle avoidance, and then saved and later used to generate an electronic or virtual map of the home. For instance, the autonomous drone may input the sensor data collected in real-time into a machine learning program that identifies obstacles, moves the autonomous drone to avoid the obstacles, and maps the layout of a home. The autonomous drone sensor data may include 3D data, image or video data, radar or LIDAR information, infrared data, etc. Additionally or alternatively, an electronic map of the home may be uploaded to the autonomous drone memory, such as transmitted from the home security system or from a smart home controller. For example, the drone may receive initial sensor data from the controller that was collected by security sensors in communication with the controller.

The method 1000 may include detecting 1006 that the home is unoccupied or another event via home-mounted or mobile device-mounted security sensors. The home may be determined to be unoccupied from security sensor data collected by the security sensors. The security sensors may be positioned around the home and/or may be integrated within the home. In at least some embodiments, the security sensors may be configured to collect security sensor data to detect an infrared signature of the interior of the home, the opening and closing of a door or garage door, and/or a vehicle or mobile device has left the premises (such as by monitoring vehicle or mobile device GPS unit coordinates) and to determine that the home or coverage area is unoccupied. The collected security sensor data may be transmitted to the drone and/or the controller for analysis.

Additionally or alternatively, the security sensors may detect events or abnormal conditions. For instance, water, smoke, or fire security sensors may indicate an abnormal water leakage, such as pipe leakage, or abnormal smoke or fire, such as from a fireplace or an oven or stove. Additionally or alternatively, the method 1000 may otherwise receive a command (i.e., a deployment signal) sent from a customer's mobile device, e.g., smart phone, smart watch, or tablet, instructing the autonomous drone to launch, and/or automatically and periodically deploy and collect drone sensor data, or otherwise monitor the home.

The method 1000 may include periodically deploying 1008 the autonomous drone from a docking and charging station. For instance, once it is determined that the home is unoccupied, the drone may be periodically deployed after a predetermined period of time, such as every few hours. Additionally or alternatively, if an event or abnormal conditions has been indicated by various home-mounted security sensors, the autonomous drone may be directed to the area of concern or zone of the home in which the abnormal event has been detected. The autonomous drone may then collect drone sensor data and confirm whether or not an abnormal condition exists, and the extent thereof.

Immediately before or after launch, the autonomous drone may perform a number of safety checks. For example, the drone may verify that it is functioning as expected or normally, that the version of the map of the home is recent, and/or identify any unexpected obstacles in its flight path (furniture, etc.) that are in view.

The method 1000 may include directing 1010 the autonomous drone to move (e.g., roll or fly) about the house. The autonomous drone may direct itself using the virtual map of the interior and/or exterior of the home. Additionally or alternatively, the autonomous drone may be configured to move about on its own without a stored navigation map. For instance, the autonomous drone may collect image data or other sensor data, and feed the image or other sensor data into a machine learning program that is trained to use the image and/or sensor data to generate a flight path in real-time that avoids obstacles. After which, the autonomous drone may be directed about the home using the flight path generated by the machine learning program. Alternatively, the drone may be configured to manual navigation. For example, a homeowner may control the drone's movement using the homeowner's mobile device to transmit navigation commands to the drone.

The method 1000 may include analyzing 1012 the autonomous drone sensor data to detect or characterize abnormal conditions or insurance-related events. If home-mounted security sensors detected an event that triggered the autonomous drone being launched, the autonomous drone sensor data may be used to verify the event and determine the extent thereof. If the autonomous drone is being deployed periodically because the home is unoccupied, the autonomous drone sensor data may be analyzed to determine an event, type of the event, and/or size or severity of the event. The autonomous drone sensor data may be analyzed by a processor mounted on the drone itself, or transmitted via a wireless communication channel, to a processor associated with the home security system or a remote server. The autonomous drone sensor data may be input in a machine learning program that is trained to detect or characterize abnormal conditions or insurance-related events (e.g., water leaks, break-ins, fires, etc.) from autonomous drone sensor data.

The method 1000 may include determining and directing 1014 a corrective action that mitigates damage to the home and personal belongings therein. For instance, autonomous drone or the controller of the home security system may direct that a sprinkler system turn on, or that a stove or oven is de-energized, if the event is unexpected smoke or fire. The autonomous drone or the controller may direct that an electronically and remotely controlled water supply valve (such as a supply valve to pipes or a dish or clothes washing machine determined to be leaking) by closed if the event is unexpected water detected. The autonomous drone or home security system may contact a home security company or police if the event is a home break-in. In some embodiments, the drone may include a response device configured to perform a corrective action. For example the drone may include a fire extinguisher and, in the event of a fire, the drone may be configured to use the fire extinguisher to put out the fire.

The method 1000 may include generating and transmitting 1016 a notification of the event or abnormal condition. For instance, the autonomous drone or the controller may generate an electronic message detailing the event and transmit the electronic message to the customer's mobile device over a wireless communication channel. The autonomous drone or home security system (or smart home controller) may stream video of the event to the customer's mobile device as well.

The method 1000 may include the autonomous drone automatically docking 1018 with the drone charging station to recharge its battery for future deployments about the home. The drone charging station may wirelessly recharge the battery—making it easier for the autonomous drone to dock and deploy from the charging station.

The method 1000 may include additional, less, or alternate actions, including those discussed elsewhere herein. The method 1000 may be implemented via one or more local or more drone-mounted, home-mounted, and/or mobile device-mounted processors, transceivers, or sensors, and/or via computer-executable instructions stored on non-transitory computer-readable medium or media.

Exemplary Home Monitoring

In one aspect, a computer system configured for home security may be provided. The computer system may include one or more processors, transceivers, or sensors configured to: (1) analyze home-mounted sensor data, and/or mobile device sensor data, to determine or detect that a home is unoccupied; (2) direct an autonomous drone to periodically deploy or launch from a drone charging station (that wirelessly recharges a drone-mounted battery), and travel about the home using one or more pre-determined routes, or a real-time obstacle avoidance technique (that detects obstacles and automatically routes the autonomous drone around the obstacles, such as by maintain a certain distance between the autonomous drone and the obstacles); (3) receive autonomous drone sensor data collected by one or more sensors mounted on the autonomous drone during a deployment; (4) analyze the autonomous drone sensor data to determine or identify an abnormal condition within the home; (5) classify or characterize the abnormal condition (such as inputting the autonomous drone sensor data into a machine learning program that is trained to identify, classify, and/or characterize the abnormal condition from processor analysis of the autonomous drone sensor data); and/or (6) determine or direct a corrective or mitigating action based upon the classification or characterization of the abnormal condition to facilitate preventing or mitigating damage to the home and/or personal articles within the home. The computer system may include additional, less, or alternate functionality, including that discussed elsewhere herein.

For instance, the abnormal condition identified may be associated with a break-in, and the corrective action may be contacting a third party security service. The abnormal condition identified may be associated with a water leakage or a water-related event, and the corrective action may be shutting an electronically controllable water supply valve. The abnormal condition identified may be associated with fire or smoke, and the corrective action may be contacting a third party security service. The corrective action may be generating an electronic message, and transmitting the electronic message to a customer mobile device via a wireless communication channel.

The autonomous drone may be an unmanned aerial vehicle or system. Additionally or alternatively, the autonomous drone may be a land-based rover or wheeled device. The corrective action may include the autonomous drone dropping chemical agents onto a fire that extinguish the fire.

In another aspect, a computer-implemented method of providing home security and/or monitoring may be provided. The method may include (1) receiving and/or analyze, via one or more processors and/or transceivers, home-mounted sensor data, and/or mobile device sensor data, to determine or detect that a home is unoccupied; (2) directing, via the one or more processors, an autonomous drone to periodically deploy or launch from a drone charging station, and travel about the home using one or more pre-determined routes, or an obstacle avoidance technique; (3) receiving, via the one or more processors and/or transceivers, autonomous drone sensor data collected by one or more sensors mounted on the autonomous drone during a deployment; (4) analyzing, via the one or more processors, the autonomous drone sensor data to determine or identify an abnormal condition within the home; (5) classifying or characterizing, via the one or more processors, the abnormal condition; and/or (6) determining or directing, via the one or more processors and/or transceivers, a corrective or mitigating action based upon the classification or characterization of the abnormal condition to facilitate preventing or mitigating damage to the home or personal articles within the home.

The method may include additional, less, or alternate actions, including those discussed elsewhere herein. The method may be implemented via one or more local or more drone-mounted, home-mounted, and/or mobile device-mounted processors, transceivers, or sensors, and/or via computer-executable instructions stored on non-transitory computer-readable medium or media.

Exemplary Home Inventory

In one aspect, a computer system in communication with, or including, an autonomous drone and configured to build or update virtual inventories may be provided. The computer system may include one or more processors, transceivers, or sensors configured to: (1) direct an autonomous drone to deploy or launch from a drone charging station, and travel about the home using one or more pre-determined routes, or real-time obstacle avoidance techniques (such as by inputting image or other sensor data collected by one or more autonomous drone-mounted cameras or sensors into a machine learning program in real-time, the machine learning program trained to identify obstacles and/or determine flight paths within a home from processor analysis of the autonomous drone-mounted camera or sensor data); (2) receive autonomous drone sensor data collected by one or more sensors mounted on the autonomous drone during the deployment via a wireless communication channel or over one or more radio links; (3) analyze the autonomous drone sensor data to determine or identify one or more features or characteristics of the home, and/or one or more personal articles (such as by inputting the autonomous drone sensor data into a machine learning program trained to identify home features or personal articles from processor analysis of the autonomous drone sensor data); (4) build or update a virtual inventory of the one or more features or characteristics of the home, and/or one or more personal articles; (5) estimate an actual or other value of the one or one or more features or characteristics of the home, and/or one or more personal articles (such as the machine learning program further being trained to estimate a value of home features or personal articles from processor analysis of the autonomous drone sensor data); (6) generate an insurance quote for homeowners or personal articles insurance based upon the virtual inventory or estimated values of the one or more features or characteristics of the home, and/or one or more personal articles, respectively; and/or (7) transmit the insurance quote over a wireless communication channel or radio link to a mobile device of a customer for their review to facilitate providing insurance coverage to customers. The computer system may include additional, less, or alternate functionality, including that discussed elsewhere herein.

For instance, the home features may include type of flooring, cabinetry, or counter tops; the home features may include type, age, make, or model of appliances, such as washer and dryer, dishwasher, oven, stove, refrigerator, sump pump, and/or water heater; the home features may include type of fireplace; the home features may include number of rooms, size of rooms, and number of floors; and/or the home features may include type of windows and doors. The personal articles may include furniture and electronics, jewelry, and/or antiques.

In another aspect, a computer-implemented method of using an autonomous drone to build or update virtual inventories of home features and/or personal articles may be provided. The method may include (1) directing, via one or more processors or transceivers, an autonomous drone to deploy or launch from a drone charging station, and travel about the home using one or more pre-determined routes, or real-time obstacle avoidance techniques; (2) receiving, via the one or more processors or transceivers, autonomous drone sensor data collected by one or more sensors mounted on the autonomous drone during the deployment via a wireless communication channel or over one or more radio links; (3) analyzing, via the one or more processors, the autonomous drone sensor data to determine or identify one or more features or characteristics of the home, and/or one or more personal articles; (4) building or updating, via the one or more processors, a virtual inventory of the one or more features or characteristics of the home, and/or one or more personal articles; (5) estimating, via the one or more processors, an actual or other value of the one or one or more features or characteristics of the home, and/or one or more personal articles; (6) generating, via the one or more processors, an insurance quote for homeowners or personal articles insurance based upon the virtual inventory or estimated values of the one or more features or characteristics of the home, and/or one or more personal articles, respectively; and/or (7) transmitting, via the one or more processors and/or transceivers, the insurance quote over a wireless communication channel or radio link to a mobile device of a customer for their review to facilitate providing insurance coverage to customers.

The method may include additional, less, or alternate actions, including those discussed elsewhere herein. The method may be implemented via one or more local or more drone-mounted, home-mounted, and/or mobile device-mounted processors, transceivers, or sensors, and/or via computer-executable instructions stored on non-transitory computer-readable medium or media.

Exemplary Repair or Replacement Cost Estimation

In one aspect, a computer system in communication with, or including, an autonomous drone and configured to estimate damage to building or personal articles may be provided. The computer system may include one or more processors, transceivers, or sensors configured to: (1) detect a trigger event from analysis of home-mounted sensor data;

(2) direct an autonomous drone to deploy or launch from a drone charging station, and travel about the home using one or more pre-determined routes (such as a predetermined route to a zone of the home associated with the trigger event), or a real-time obstacle avoidance technique; (3) receive autonomous drone sensor data collected by one or more sensors mounted on the autonomous drone during the deployment via a wireless communication channel or over one or more radio links; (4) analyze the autonomous drone sensor data to determine or identify one or more areas of the home that include (i) damage to one or more features of the home, and/or (ii) damage to one or more personal articles (such as by inputting the autonomous drone sensor data into a machine learning program that is trained to identify damaged home features or personal articles, and/or estimate a repair or replacement cost from processor analysis of the autonomous drone sensor data); (5) estimate a repair or replacement cost for the one or one or more features of the home, and/or one or more personal articles that were damaged; (6) generate a proposed insurance claim associated with homeowners or personal articles insurance based upon the estimated repair or replacement cost of the one or more features of the home, and/or the one or more personal articles, respectively; and/or (7) transmit the proposed insurance claim over a wireless communication channel or radio link to a mobile device of a customer for their review and/or approval to facilitate prompt handling of insurance claims and providing enhanced customer service to customers. The computer system may include additional, less, or alternate functionality, including that discussed elsewhere herein.

For instance, the home features may include type of flooring, cabinetry, or counter tops; the home features may include type, age, make, or model of appliances, such as washer and dryer, dishwasher, oven, stove, refrigerator, sump pump, and/or water heater; the home features may include type of fireplace; the home features may include number of rooms, size of rooms, and number of floors; and/or the home features may include type of windows and doors. The personal articles may include furniture and electronics, and/or paintings or antiques.

In another aspect, a computer-implemented method of using an autonomous drone to estimate damage to building or personal articles after an event may be provided. The method may include (1) detecting, via one or more processors, transceivers, or sensors, a trigger event from analysis of home-mounted sensor data; (2) directing, via the one or more processors, an autonomous drone to deploy or launch from a drone charging station, and travel about the home using one or more pre-determined routes, or a real-time obstacle avoidance technique; (3) receiving, via the one or more processors or transceivers, autonomous drone sensor data collected by one or more sensors mounted on the autonomous drone during the deployment via a wireless communication channel or over one or more radio links; (4) analyzing, via the one or more processors, the autonomous drone sensor data to determine or identify one or more areas of the home that include (i) damage to one or more features of the home, and/or (ii) damage to one or more personal articles; (5) estimating, via the one or more processors, a repair or replacement cost for the one or one or more features of the home, and/or one or more personal articles that were damaged; (6) generating, via the one or more processors, a proposed insurance claim associated with homeowners or personal articles insurance based upon the estimated repair or replacement cost of the one or more features of the home, and/or the one or more personal articles, respectively; and/or (7) transmitting, via the one or more processors and/or transceivers, the proposed insurance claim over a wireless communication channel or radio link to a mobile device of a customer for their review and/or approval to facilitate prompt handling of insurance claims and providing enhanced customer service to customers.

The method may include additional, less, or alternate actions, including those discussed elsewhere herein. The method may be implemented via one or more local or more drone-mounted, home-mounted, and/or mobile device-mounted processors, transceivers, or sensors, and/or via computer-executable instructions stored on non-transitory computer-readable medium or media.

Exemplary Drone Integration with Home Security System

In one aspect, a computer system configured for home security or monitoring may be provided. The computer system may include one or more processors, transceivers, or sensors configured to: (1) wirelessly integrate an autonomous drone into the computer system; (2) direct to the autonomous drone to collect autonomous drone-mounted sensor data; (3) use the autonomous drone-mounted sensor data collected to build or update a virtual map of an interior of a home; (4) analyze home-mounted sensor data, and/or mobile device sensor data, to determine or detect that a home is unoccupied; (5) direct the autonomous drone to periodically deploy or launch from a drone charging station, and travel about the home using one or more pre-determined routes outlined with respect to the virtual map of the interior of the home, or a real-time obstacle avoidance technique (such as by collecting autonomous drone-mounted image or other sensor data, and inputting that image or other sensor data into a machine learning program that is trained to detect obstacles and automatically route the autonomous drone around the obstacles based upon the image and/or other sensor data collected—such as by maintaining a certain distance (e.g., 12 inches) between the autonomous drone and the obstacles identified from processor analysis of the drone sensor data); (6) receive autonomous drone sensor data collected by one or more sensors mounted on the autonomous drone during a deployment; (7) analyze the autonomous drone sensor data to determine or identify an abnormal condition within the home (such as by inputting the autonomous drone sensor data into a machine learning program trained to identify abnormal conditions, and type and extent thereof, from the autonomous drone sensor data); (8) classify or characterize the abnormal condition (such as by inputting the autonomous drone sensor data into the machine learning program, which is also trained to classify or characterize the abnormal condition (e.g., water, security, or fire event) from the autonomous drone sensor data); and/or (9) determine or direct a corrective or mitigating action based upon the classification or characterization of the abnormal condition to facilitate preventing or mitigating damage to the home or personal articles within the home. The computer system may include additional, less, or alternate functionality, including that discussed elsewhere herein.

For instance, the abnormal condition identified may be associated with a break-in, and the corrective action may be contacting a third party security service. The abnormal condition identified may be associated with a water leakage or a water-related event, and the corrective action may be shutting an electronically controllable water supply valve. The abnormal condition identified may be associated with fire or smoke, and the corrective action may be contacting a third party security service. The corrective action may be generating an electronic message, and transmitting the electronic message to a customer mobile device via a wireless communication channel.

In another aspect, a computer-implemented method for providing home security or monitoring may be provided. The method may include, via one or more processors, transceivers, or sensors: (1) wirelessly integrating an autonomous drone into a home security system; (2) directing the autonomous drone to collect autonomous drone-mounted sensor data; (3) using the autonomous drone-mounted sensor data collected to build or update a virtual map of an interior of a home; (4) analyzing home-mounted sensor data, or mobile device sensor data, to determine or detect that a home is unoccupied; (5) directing the autonomous drone to periodically deploy or launch from a drone charging station, and travel about the home using (i) one or more pre-determined routes outlined with respect to the virtual map of the interior of the home, or (ii) a real-time obstacle avoidance technique (such as by collecting autonomous drone-mounted image or other sensor data, and inputting that image or other sensor data into a machine learning program that is trained to detect obstacles and automatically route the autonomous drone around the obstacles based upon the image and/or other sensor data collected—such as by maintaining a certain distance between the autonomous drone and the obstacles identified from processor analysis of the drone sensor data); (6) receiving autonomous drone sensor data collected by one or more sensors mounted on the autonomous drone during a deployment; (7) analyzing the autonomous drone sensor data to determine or identify an abnormal condition within the home (such as by inputting the autonomous drone sensor data into a machine learning program trained to identify abnormal conditions, and type and extent thereof, from the autonomous drone sensor data); (8) classifying or characterizing the abnormal condition (such as by inputting the autonomous drone sensor data into the machine learning program, which is also trained to classify or characterize the abnormal condition (e.g., water, security, or fire event) from the autonomous drone sensor data); and/or (9) determining or directing a corrective or mitigating action based upon the classification or characterization of the abnormal condition to facilitate preventing or mitigating damage to the home or personal articles within the home.

The method may include additional, less, or alternate actions, including those discussed elsewhere herein. The method may be implemented via one or more local or more drone-mounted, home-mounted, and/or mobile device-mounted processors, transceivers, or sensors, and/or via computer-executable instructions stored on non-transitory computer-readable medium or media.

Additional Considerations

With the foregoing, an insurance customer may opt-in to a rewards, insurance discount, or other type of program. After the insurance customer provides their permission or affirmative consent, an insurance provider remote server may collect drone and/or smart home sensor data (including image or audio data) associated with insured assets, including before, during, and/or after an insurance-related event. In return, risk averse insureds and home owners may receive discounts or insurance cost savings related to auto, home, life, and other types of insurance from the insurance provider.

In one aspect, drone and smart home sensor data, and/or other data, including the types of data discussed elsewhere herein, may be collected or received by an insured's mobile device or drone, or an App running thereon, and/or an insurance provider remote server, such as via direct or indirect wireless communication or data transmission from an application running on the insured's mobile device, drone, or smart home controller, after the insured or customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, vehicles or personal articles, and/or (ii) family members.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A response system comprising:
   an autonomous drone comprising a processor, a memory in communication with the processor, and a sensor, the processor programmed to:
   build a virtual map of a coverage area in response to the autonomous drone moving about the coverage area;
   store the virtual map in the memory;
   receive a deployment signal;
   deploy the autonomous drone in response to the deployment signal, the autonomous drone deployed to collect sensor data of the coverage data while moving about the coverage area;
   control movement of the autonomous drone within the coverage area using the virtual map;
   collect the sensor data of the coverage area using the sensor coupled to the autonomous drone, the sensor data including image data of at least one personal article within the coverage area;
   analyze the sensor data;
   in response to analyzing the sensor data, identify the at least one personal article within the coverage area;
   assign to each of the at least one identified personal article a corresponding list identifier and the corresponding image data, wherein the corresponding list identifier identifies one or more characteristics of each of the at least one identified personal article; and
   generate an inventory list of the coverage area using the sensor data collected by the sensor coupled to the autonomous drone, the inventory list including each of the at least one identified personal article within the coverage area, wherein each entry within the inventory list includes the list identifier and the image data corresponding to each of the at least one identified personal article.

2. The response system in accordance with claim 1, wherein the coverage area includes an interior of a building.

3. The response system in accordance with claim 1, wherein the processor is further configured to calculate a value amount of each of the at least one identified personal article.

4. The response system in accordance with claim 3, wherein the processor is further programmed to generate an insurance quote for an insurance policy associated with at least one of the coverage area and each of the at least one identified personal article based upon the value amount.

5. The response system in accordance with claim 1, wherein the inventory list further includes a coverage area characteristic, wherein the processor is further configured to calculate a value amount of the coverage area characteristic.

6. The response system in accordance with claim 5, wherein the coverage area characteristic includes at least one of a number of rooms, a number of bathrooms, a size of a room, roofing type, siding type, lighting type, fireplace, and storage devices.

7. The response system in accordance with claim 1, wherein the inventory list is stored in the memory, and wherein the image data indicates a location of each of the at least one identified personal article within the coverage area.

8. The response system in accordance with claim 1, wherein the processor is further programmed to:
   detect a trigger event associated with an abnormal condition occurring within the coverage area;
   determine a location of the abnormal condition within the coverage area, the abnormal condition including at least one of (i) damage occurring within the coverage area, and (ii) theft occurring within the coverage area;
   capture, using the sensor, claim data associated with the abnormal condition;
   calculate at least one of a damage cost and a repair cost associated with the abnormal condition; and
   transmit the claims data to an insurance computing device.

9. The response system in accordance with claim 1, wherein the processor is further programmed to generate an insurance claim for an insurance policy associated with the coverage area.

10. The response system in accordance with claim 1, wherein the processor is further programmed to:
    detect an obstacle, wherein the obstacle is one of a wall, floor, and ceiling;
    determine a position of the autonomous drone relative the obstacle; and
    adjust the position of the autonomous drone away from the obstacle when the determined position of the autonomous drone is below a predetermined threshold distance relative to the obstacle.

11. The response system in accordance with claim 1, wherein the processor is further programmed to:
- determine a first position of the autonomous drone relative to the virtual map based on at least one of dead reckoning and navigation data received from a plurality of sensors associated with the coverage area; and
- navigate the autonomous drone from the first position to a second position based on the virtual map and the first position.

12. The response system in accordance with claim 1, wherein the processor is further programmed to:
- receive directions to a charging station associated with the autonomous drone;
- automatically navigate the autonomous drone to the charging station based on the directions; and
- dock the autonomous drone at the charging station.

13. A method for generating an inventory list for a coverage area using a response system that includes an autonomous drone and a processor, said method comprising:
- building a virtual map of a coverage area in response to the autonomous drone moving about the coverage area;
- storing the virtual map in a memory associated with the autonomous drone;
- receiving, by the autonomous drone, a deployment signal;
- deploying the autonomous drone in response to the deployment signal, the autonomous drone deployed to collect sensor data of the coverage data while moving about the coverage area;
- controlling, by the processor, movement of the autonomous drone within the coverage area using the virtual map;
- collecting the sensor data of the coverage area using a sensor coupled to the autonomous drone, the sensor data including image data of at least one personal article within the coverage area;
- analyzing, by the processor, the sensor data;
- in response to analyzing the sensor data, identifying, by the processor, the at least one personal article within the coverage area;
- assigning, by the processor, to each of the at least one identified personal article a corresponding list identifier and the corresponding image data, wherein the corresponding list identifier identifies one or more characteristics of each of the at least one identified personal article; and
- generating an inventory list of the coverage area using the sensor data collected by the sensor coupled to the autonomous drone, the inventory list including each of the at least one identified personal article within the coverage area, wherein each entry within the inventory list includes the list identifier and the image data corresponding to each of the at least one identified personal article.

14. The method in accordance with claim 13, wherein the coverage area includes an interior of a building.

15. The method in accordance with claim 13, wherein analyzing the sensor data further comprises calculating a value amount of each of the at least one identified personal article.

16. The method in accordance with claim 15 further comprising generating an insurance quote for an insurance policy associated with at least one of the coverage area and each of the at least one identified personal article based upon the value amount.

17. The method in accordance with claim 13, wherein the inventory list further includes a coverage area characteristic, wherein analyzing the sensor data further comprises calculating a value amount of the coverage area characteristic.

18. The method in accordance with claim 17, wherein the coverage area characteristic includes at least one of a number of rooms, a number of bathrooms, a size of a room, roofing type, siding type, lighting type, fireplace, and storage devices.

19. The method in accordance with claim 13, wherein the inventory list is stored within the memory, and wherein the image data indicates a location of each of the at least one identified personal article within the coverage area.

20. The method in accordance with claim 13 further comprising:
- detecting, by the processor, a trigger event associated with an abnormal condition occurring within the coverage area;
- determining a location of the abnormal condition within the coverage area, the abnormal condition including at least one of (i) damage occurring within the coverage area, and (ii) theft occurring within the coverage area;
- capturing, using the sensor, claim data associated with the abnormal condition;
- calculating, by the processor, at least one of a damage cost and a repair cost associated with the trigger event; and
- transmitting the claims data to an insurance computing device.

\* \* \* \* \*